United States Patent
Park et al.

(10) Patent No.: US 11,510,048 B2
(45) Date of Patent: Nov. 22, 2022

(54) METHOD AND APPARATUS FOR REINSTALLING SIM PROFILE IN WIRELESS COMMUNICATION SYSTEM

(71) Applicant: Samsung Electronics Co., Ltd., Suwon-si (KR)

(72) Inventors: Jonghan Park, Suwon-si (KR); Duckey Lee, Suwon-si (KR); Sujung Kang, Suwon-si (KR); Hyewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/039,973

(22) Filed: Sep. 30, 2020

(65) Prior Publication Data

US 2021/0105609 A1    Apr. 8, 2021

(30) Foreign Application Priority Data

Oct. 2, 2019   (KR) ........................ 10-2019-0122331

(51) Int. Cl.
*H04W 8/20*    (2009.01)
*H04W 8/18*    (2009.01)

(52) U.S. Cl.
CPC .......... *H04W 8/205* (2013.01); *H04W 8/183* (2013.01)

(58) Field of Classification Search
CPC ...... H04W 8/205; H04W 8/183; H04W 12/35
See application file for complete search history.

(56) References Cited

U.S. PATENT DOCUMENTS

| | | | |
|---|---|---|---|
| 10,187,784 B1 * | 1/2019 | Chen | H04W 12/42 |
| 10,764,746 B1 * | 9/2020 | Dreiling | H04W 8/26 |
| 11,146,948 B1 * | 10/2021 | Uehling | H04W 12/35 |
| 2015/0303966 A1 | 10/2015 | Lee et al. | |
| 2016/0105540 A1 * | 4/2016 | Kwon | H04N 21/4312 715/747 |
| 2017/0338954 A1 | 11/2017 | Yang et al. | |
| 2018/0104178 A1 | 4/2018 | Portolan et al. | |
| 2019/0075453 A1 | 3/2019 | Yoon et al. | |

(Continued)

FOREIGN PATENT DOCUMENTS

| | | |
|---|---|---|
| EP | 3413685 A1 | 12/2018 |
| KR | 10-2015-0122018 A | 10/2015 |
| KR | 10-1830665 B1 | 2/2018 |

OTHER PUBLICATIONS

International Search Report dated Dec. 30, 2020 in connection with International Patent Application No. PCT/KR2020/013413, 3 pages.

(Continued)

*Primary Examiner* — Barry W Taylor

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

20 Claims, 19 Drawing Sheets

(56) References Cited

U.S. PATENT DOCUMENTS

| | | | |
|---|---|---|---|
| 2019/0174299 A1* | 6/2019 | Ullah | H04W 4/50 |
| 2019/0208403 A1 | 7/2019 | Namiranian | |
| 2019/0327605 A1 | 10/2019 | Fan et al. | |
| 2020/0059778 A1* | 2/2020 | Li | H04W 12/40 |
| 2020/0120484 A1* | 4/2020 | Ullah | H04W 8/205 |
| 2020/0137566 A1* | 4/2020 | Jin | H04W 12/43 |
| 2021/0014669 A1* | 1/2021 | Goyal | H04W 8/205 |
| 2022/0070655 A1* | 3/2022 | Lim | H04L 67/306 |

OTHER PUBLICATIONS

European Patent Office, "Supplementary European Search Report," dated Sep. 16, 2022, in connection with European Application No. 20871716.5, 8 pages.

* cited by examiner

Normal Mode: Sw operation mode for controlling eUICC of mainboard by mainboard controller Slave AS Mode: Sw operation mode for controlling eUICC of mainboard by controller outside mainboard Master AS mode: Configuration for controlling eUICC outside mainboard by controller of mainboard

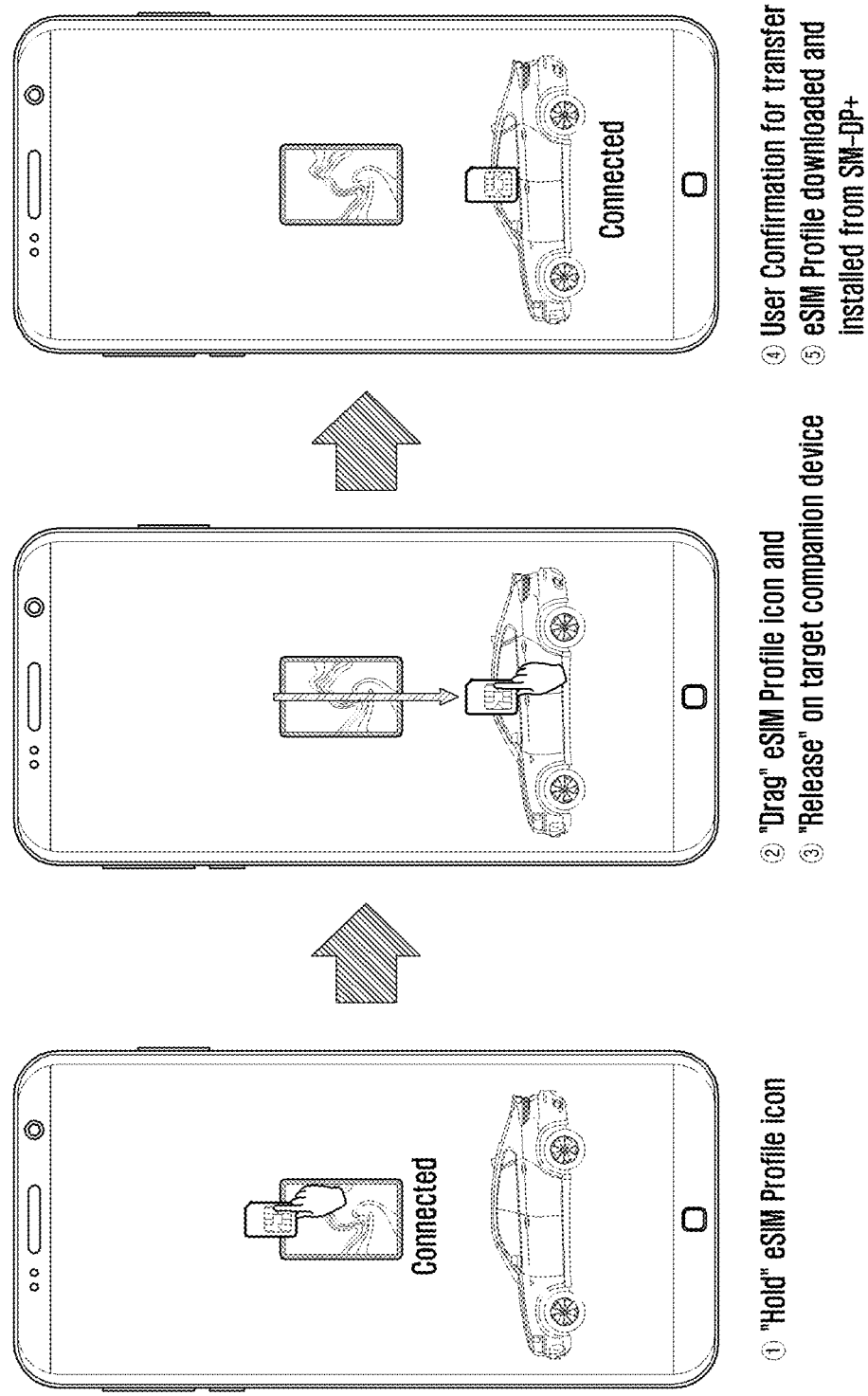

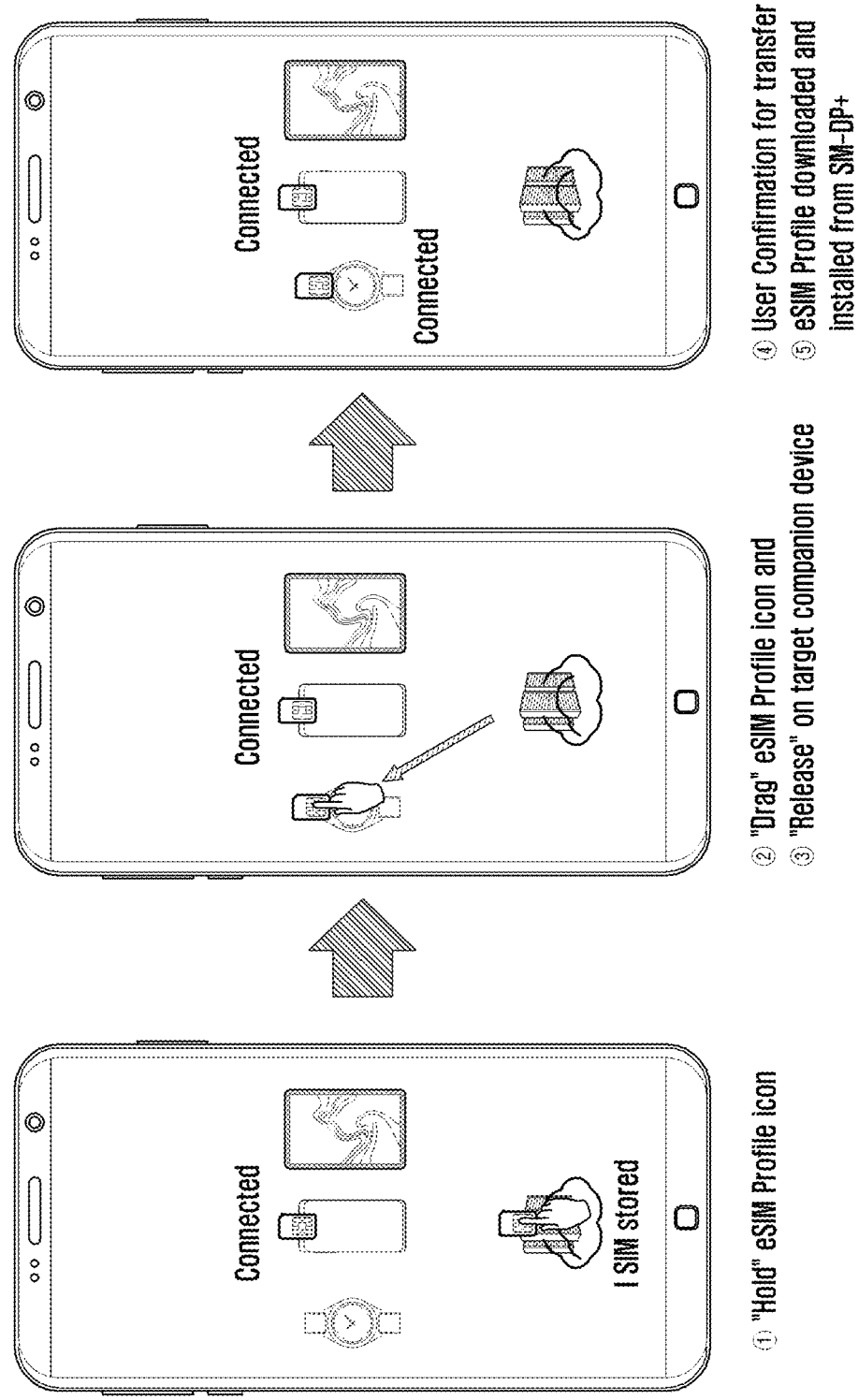

METHOD AND APPARATUS FOR REINSTALLING SIM PROFILE IN WIRELESS COMMUNICATION SYSTEM

CROSS-REFERENCE TO RELATED APPLICATION

This application is based on and claims priority under 35 U.S.C. § 119 to Korean Patent Application No. 10-2019-0122331 filed on Oct. 2, 2019 in the Korean Intellectual Property Office, the disclosure of which is herein incorporated by reference in its entirety.

BACKGROUND

1. Field

The disclosure relates to a wireless communication system, and to a method and an apparatus for reinstalling access information for accessing a communication system in a device.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A universal integrated circuit card (UICC) is a smart card inserted and used in a mobile communication terminal, etc. and is called a UICC card. The UICC may include an access control module for accessing a network of a mobile communication service provider. Examples of such an access control module are a universal subscriber identity module (USIM), a subscriber identity module (SIM), and an IP multimedia service identity module (ISIM). A UICC including a USIM is also commonly called a USIM card. Similarly, a UICC including a SIM module is also commonly called a SIM card. In the following description of the disclosure, a SIM card may be used as a common meaning including a UICC card, a USIM card, and a UICC including an ISIM. That is, even if a SIM card is mentioned in the disclosure, the technical applications thereof can be applied to a USIM card, an ISIM card, or a general UICC card in the same way.

The SIM card stores personal information of a mobile communication subscriber, and performs authentication of the subscriber and generation of a traffic security key at the time of access to a mobile communication network, so as to enable the subscriber to securely use mobile communications.

The SIM card is generally manufactured as an exclusive card for a particular mobile communication service provider in response to a request of the service provider. Authentication information for access to a network of the service provider, for example, a universal subscriber identity module (USIM) application, an international mobile subscriber identity (IMSI), a K value, and an OPc value are previously mounted in the SIM card to be released. Therefore, the manufactured SIM card is received by the mobile communication service provider and then provided to a subscriber. Thereafter, if it is necessary, the SIM card may also perform management, such as installation of an application in the UICC, and modification and removal thereof, by using a technology like over the air (OTA). The subscriber may insert the UICC card in his/her own mobile communication terminal to use the network of the mobile communication service provider and an application service. When the terminal is changed, the subscriber may remove the UICC card from the existing terminal and insert the UICC card into a new terminal, so that the subscriber can use the authentication information, the mobile communication phone number, and the personal contact list, which are stored in the UICC card, as it is in the new terminal.

However, the SIM card provides an inconvenience for the user of the mobile communication terminal receiving a service from another mobile communication company. The inconvenience is that the user of the mobile communication terminal has to physically obtain a SIM card to receive a service from a mobile communication service provider. For example, when the user travels to other countries, the user has the inconvenience of having to obtain a local SIM card to receive a local mobile communication service. A roaming service may somewhat ease the inconvenience, but also has a problem in that the roaming service costs a lot and is not available when there is no contract between the communication companies.

Meanwhile, if the SIM module is remotely downloaded and installed in a UICC card, much of the inconvenience can be resolved. That is, a user can download, in a UICC card, a SIM module of a mobile communication service that the user wants to use, at a desired time point. In addition, a plurality of SIM modules may be downloaded and installed in such a UICC card, and only one of the SIM modules may be selected to be used. Such a UICC card may be fixed or not be fixed to a terminal.

The international compatibility of such a UICC card has been maintained according to the physical shape and logical functions of the UICC card, defined by a standardization organization that is called a European telecommunications standards institute (ETSI). In view of a form factor defining physical shape, the size of SIMs has become smaller from a mini SIM, through a micro SIM, that is most widely used, through a micro SIM, to a nano SIM recently used. The size reduction of SIMs has contributed much to size reduction of a mobile communication terminal. However, the standardization of a UICC card having a smaller size than a nano SIM recently established is expected to be difficult because of a risk that a user may lose the card. Moreover, a space for mounting an attachment/detachment slot is required for a terminal due to the characteristic of an attachable/detachable UICC card. Therefore, further size reduction is expected to be difficult.

In order to solve the problems, the requirement of embedding a security module for performing similar functions with the UICC in a mobile communication terminal upon manufacture of the terminal to replace the UICC has come to the fore. In response to the requirements, an embedded universal integrated circuit card (eUICC) structure that is UICC not attachable and detachable has been provided.

As described above, a UICC fixed to a terminal to be used is called an embedded UICC (eUICC). Generally, an eUICC means a UICC card which is fixed to a terminal to be used and can remotely download a SIM module from a profile server and select the SIM module. In the disclosure, a UICC card which can remotely download and select a SIM module may be collectively referred to as an eUICC. That is, a UICC card fixed to a terminal and a UICC card not fixed to a terminal among UICC cards capable of downloading and selecting a SIM module may be collectively referred to as an eUICC. In addition, SIM module information that is downloaded may be collectively referred to as the term "an eUICC profile." Moreover, one installed profile commonly corresponds to a subscribed communication service plan or a phone number. Therefore, in the description of the disclosure, it should be noted that displaying an installed profile on a screen of a terminal or selecting a displayed profile can be replaced with displaying or selecting a plan, a corresponding phone number, a corresponding nickname, a corresponding label, or a corresponding symbol or icon.

When a terminal is changed, a subscriber may remove the SIM card from the existing terminal and insert the SIM card into a new terminal so as to use an access to a mobile communication network as it is by using authentication information stored in the UICC card. However, if such an eUICC is mounted in a terminal, a downloaded SIM module is decoded and installed only in the eUICC, and thus is unable to be extracted to the outside after installation. Therefore, a difficulty may occur when the subscriber tries to use a new terminal after replacing the terminal.

Meanwhile, in a case where a SIM card is lost, a mobile communication company provides a conventional procedure of checking a subscriber's identity or ID authentication process and reissuing a SIM card. If the process is applied to an eUICC, the process can be also carried out in the case of terminal replacement. However, the identity or ID authentication checking process incurs inconveniences in that the process is commonly managed only when the subscriber directly visits an off-line store, or the ID authentication checking process has to be made more strict when the process is conducted on-line, so as to prevent misuse of the process such as phone number hacking/extortion. Moreover, a problem occurs in that there are often no suitable means for the ID authentication checking process, and thus the process is not easy to handle.

The above information is presented as background information only to assist with an understanding of the disclosure. No determination has been made, and no assertion is made, as to whether any of the above might be applicable as prior art with regard to the disclosure.

SUMMARY

The technical problem to be solved through the disclosure is to provide a downloading method which does not require a separate ID authentication checking process when a new terminal replaced in a communication system downloads, online, a new eUICC profile corresponding to a profile stored in an eUICC of an existing terminal, and installs the new eUICC profile in order to connect to a communication service used by the existing terminal.

In order to solve the problem described above, the disclosure may provide an operation method of a first terminal, the method including: transmitting a first message indicating removal of a profile stored in a second terminal to the second terminal; receiving a second message including information relating to the removal of the profile from the second terminal; and transmitting a third message including the information to a third terminal, wherein the information is used to newly install a profile corresponding to the profile stored in the second terminal in the third terminal.

In embodiments, the corresponding profile may include an integrated circuit card identifier (ICCID) identical to that of the profile stored in the second terminal.

In embodiments, the corresponding profile may include a profile corresponding to a mobile station international subscriber directory number (MSISDN) identical to that of the profile stored in the second terminal.

In embodiments, the third message may further include a profile nickname of the profile.

In embodiments, the method may further include: selecting the profile of the second terminal on a display unit of the first terminal; and selecting the third terminal to which the selected profile is transferred, wherein the first message is transmitted based on the selection of the third terminal.

In embodiments, the information may include delete notification information or activation code information, the activation code information may include an entirety or a part of the delete notification information, and the delete notification information may include at least one of an address of a profile server, an embedded universal integrated circuit card (eUICC) signature of the second terminal, an ID of the profile, an integrated circuit card identifier (ICCID), eUICC certificate information of the second terminal, or information preventing repetitive use of the second message.

In embodiments, the first terminal may include a switch structure configured to connect a local profile assistant (LPA) of the first terminal and an embedded universal integrated circuit card (eUICC) of the second terminal.

In embodiments, when at least one of the first terminal or the second terminal is in an AS mode, the first terminal may transmit the first message and receive the second message through the connection between the local profile assistant (LPA) of the first terminal and the embedded universal integrated circuit card (eUICC) of the second terminal, based on the switch structure.

In another example of the disclosure, an operation method of a second terminal may include: receiving a first message indicating removal of a profile stored in the second terminal from a first terminal; after the first message is received, removing the profile; generating information relating to the removal of the profile; and transmitting a second message including the information to the first terminal, wherein the information is used to newly install a profile corresponding to the profile stored in the second terminal in the third terminal.

In embodiments, the corresponding profile may include an integrated circuit card identifier (ICCID) identical to that of the profile stored in the second terminal.

In embodiments, the corresponding profile may include a profile corresponding to a mobile station international subscriber directory number (MSISDN) identical to that of the profile stored in the second terminal.

In embodiments, the information may include delete notification information or activation code information, the activation code information may include an entirety or a part of the delete notification information, and the delete notification information may include at least one of an address of a profile server, an embedded universal integrated circuit card (eUICC) signature of the second terminal, an ID of the profile, an integrated circuit card identifier (ICCID), eUICC certificate information of the second terminal, or information preventing repetitive use of the second message.

In embodiments, the second terminal may include a switch structure configured to connect a local profile assistant (LPA) of the first terminal and an embedded universal integrated circuit card (eUICC) of the second terminal, and when at least one of the first terminal or the second terminal is in an AS mode, the second terminal may receive the first message and transmit the second message through the connection between the local profile assistant (LPA) of the first terminal and the embedded universal integrated circuit card (eUICC) of the second terminal, based on the switch structure.

In yet other examples of the disclosure, an operation method of a third terminal may include: receiving a third message including information relating to removal of a first profile from a first terminal; and installing a second profile by using the information, wherein the information is used to newly install a profile corresponding to the first profile stored in a second terminal in the third terminal, and wherein the third message includes a profile nickname of the first profile.

In embodiments, the corresponding profile may include an integrated circuit card identifier (ICCID) identical to that of the first profile stored in the second terminal.

In embodiments, the corresponding profile may include a profile corresponding to a mobile station international subscriber directory number (MSISDN) identical to that of the first profile stored in the second terminal.

In embodiments, the installing of the profile may include: downloading the second profile from a profile server through the first terminal, and installing the second profile; and after the second profile is downloaded and installed, updating a profile nickname of the second profile to the profile nickname of the first profile.

In yet other examples of the disclosure, a first terminal may include: a transceiver which can transmit or receive at least one signal; and a controller coupled to the transceiver, wherein the controller is configured to: transmit a first message indicating removal of a profile stored in a second terminal to the second terminal; receive a second message including information relating to the removal of the profile from the second terminal; and transmit a third message including the information to a third terminal, and wherein the information is used to newly install a profile corresponding to the profile stored in the second terminal in the third terminal.

In yet other examples of the disclosure, a second terminal may include: a transceiver which can transmit or receive at least one signal; and a controller coupled to the transceiver, wherein the controller is configured to: receive a first message indicating removal of a profile stored in the second terminal from a first terminal; after the first message is received, remove the profile; generate information relating to the removal of the profile; and transmit a second message including the information to the first terminal, wherein the information is used to newly install a profile corresponding to the profile stored in the second terminal in the third terminal.

In yet other examples of the disclosure, a third terminal may include: a transceiver which can transmit or receive at least one signal; and a controller coupled to the transceiver, wherein the controller is configured to: receive a third message including information relating to removal of a first profile from a first terminal; and install a second profile by using the information, wherein the information is used to newly install a profile corresponding to the first profile stored in a second terminal in the third terminal, and wherein the third message includes a profile nickname of the first profile.

The technical problems to be solved in the disclosure are not limited to the above described technical problems, and other technical problems that have not been mentioned may be clearly understood by those skilled in the art from the following description.

According to an embodiment, when a terminal having an eUICC mounted therein is changed in a communication system, a profile can be conveniently transferred between the existing terminal and a new terminal by controlling only the devices without additional checking of an identity or a subscriber ID. Specifically, according to an embodiment, even if a controller of the existing terminal, excepting the eUICC of the existing terminal, is not operated, the profile can be transferred through connecting an external device to the terminal. Additionally, according to an embodiment, a profile of a first peripheral device can be transferred to a second peripheral device by using a primary terminal, the screen of which can be conveniently controlled.

Additionally, according to an embodiment, a profile of a first peripheral device can be backed up in a cloud server by using a primary terminal, the screen of which can be conveniently controlled, and the profile can be restored in the cloud server later to be transferred to a second peripheral device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9C illustrates another example of a user UX of a device during the operation illustrated in FIG. 9A;

FIG. 11B illustrates an example of a user UX of a device during the operation illustrated in FIG. 11A according to the disclosure.

DETAILED DESCRIPTION

Figure 1:
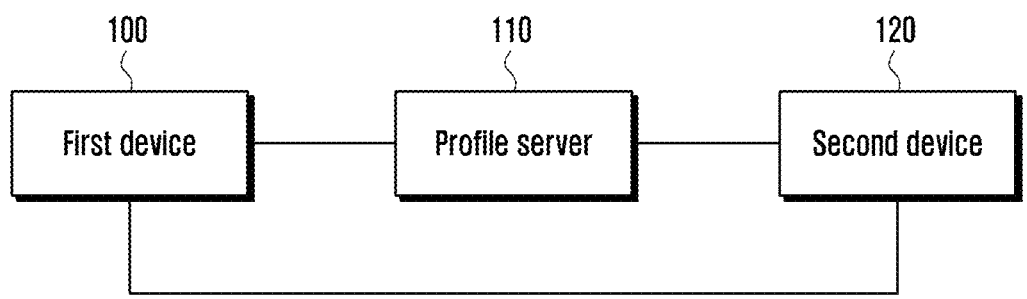
FIG. 1 illustrates an example of a configuration of a communication system to which an embodiment is applied.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

First, terms used in the detailed description will be defined.

In the detailed description, a UICC is a smart card inserted and used in a mobile communication terminal, and indicates a chip which stores personal information, such as network access authentication information, a contact list, and a short message service (SMS) of a mobile communication subscriber, so that when the terminal accesses a mobile communication network such as a global system for mobile communications (GSM), wideband code division multiple access (WCDMA), and LTE, the chip performs authentication of the subscriber and generation of a traffic security key, so as to enable the subscriber to securely use mobile communications. A UICC may include a communication application mounted therein, such as a subscriber identification module (SIM), a universal SIM (USIM), and an IP multimedia SIM (ISIM), according to the type of a mobile communication network accessed by a subscriber. Moreover, the UICC may provide a high level security function for mounting various applications including an electronic wallet, ticketing, and an electronic passport.

In the detailed description, an embedded UICC (eUICC) is a chip-type security module embedded in a terminal rather than an attachable/detachable-type module that can be inserted in and removed from a terminal. An eUICC may download a profile by using an over the air (OTA) technology and install the profile. An eUICC may be called a UICC capable of downloading and installing a profile.

In the detailed description, a method of downloading a profile in an eUICC by using an over the air (OTA) technology and installing the profile in the eUICC may be also applied to an attachable/detachable-type UICC which can be inserted in or removed from a terminal. That is, an embodiment may be applied to a UICC which can download a profile by using an over the air (OTA) technology and install the profile.

In the detailed description, the term "a UICC" may be used together with a SIM, and the term "an eUICC" may be used together with an eSIM.

In the detailed description, a profile may indicate a package obtained through packaging an application, a file system, and an authentication key value stored in a UICC, in a software type. In addition, a profile may be named access information.

In the detailed description, a USIM profile may be identical to a profile, or may indicate a package obtained through packaging information included in a USIM application in the profile, in a software type.

In the detailed description, a profile server may include a function of generating a profile, encrypting the generated profile, generating a profile remote management instruction, or encrypting the generated profile remote management instruction, and the functions may be expressed by subscription manager data preparation (SM-DP), subscription manager data preparation plus (SM-DP+), and subscription manager secure routing (SM-SR).

The term "a device" used in the detailed description may be called "a terminal". "A terminal" or "a device" may be called a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various embodiments of a terminal may include: a cellular phone, a smart phone having a wireless communication function, a personal portable terminal (PDA) having a wireless communication function, a wireless modem, a portable computer having a wireless communication function, an image capturing device such as a digital camera having a wireless communication function, a gaming device having a wireless communication function, a music storage and playback appliance having a wireless communication function, and an Internet appliance capable of wireless Internet access and browsing; and a portable unit or terminal incorporating combinations of such functions. In addition, a terminal may include a machine-to-machine (M2M) terminal, and a machine-type communication (MTC) terminal/device, but the terminal is not limited thereto. In the detailed description, the terminal may be also called an electronic device or simply a device.

In the detailed description, the terminal or device may include software or an application installed in the terminal or device to control a UICC or an eUICC. The software or application may be called, for example, a local profile assistant (LPA).

In the detailed description, an eUICC identifier (eUICC ID) may be a unique identifier of an eUICC embedded in a terminal, and may be called an EID.

In the detailed description, an application protocol data unit (APDU) may correspond to a message for linking a controller in a terminal or device to an eUICC.

In the detailed description, a profile package may be used together with a profile, or may be used as a term indicating a data object of a particular profile, and may be called a profile TLV, or a profile package TLV. If a profile package is encrypted using a ciphering parameter, the profile package may be named a protected profile package (PPP), or a protected profile package TLV (PPP TLV). If a profile package is encrypted using a ciphering parameter allowing decoding by only a particular eUICC, the profile package may be named a bound profile package (BPP), or a bound profile package TLV (BPP TLV). A profile package TLV may correspond to a data set expressing information configuring a profile in a tag, length, and value (TLV) type.

In the detailed description, an AKA may indicate an authentication and key agreement, and may indicate an authentication algorithm for accessing 3GPP and 3GPP2 networks.

In the detailed description, the letter "K" is an encryption key value stored in an eUICC and used for an AKA authentication algorithm.

In the detailed description, OPc is a parameter value which may be stored in an eUICC and is used for an AKA authentication algorithm.

In the detailed description, an NAA is a network access application, and may be an application such as an USIM or an ISIM stored in a UICC for network access. An NAA may be a network access module.

In addition, in describing the disclosure, a detailed description of known relevant functions or configurations incorporated herein will be omitted when it may make the subject matter of the disclosure rather unclear.

As mentioned above, when a terminal is changed, a subscriber may remove a SIM card from the existing terminal and insert the SIM card into a new terminal so as to use an access to a mobile communication network as it is by using authentication information stored in a UICC card. However, if such an eUICC is mounted in a terminal, a downloaded SIM module is decoded and installed only in the eUICC, and thus is unable to be extracted to the outside after installation. Therefore, a difficulty may occur when the subscriber tries to use a new terminal after replacing the terminal. Moreover, in a case where a SIM card is lost, a mobile communication company provides a conventional procedure of checking a subscriber's identity or ID authentication process and reissuing a SIM card. If the process is applied to an eUICC, the process can be also carried out in the case of terminal replacement. However, the identity or ID authentication checking process incurs inconveniences in that the process is commonly managed only when the subscriber directly visits an off-line store, or the ID authentication checking process has to be made more strict when the process is conducted on-line, so as to prevent misuse of the process such as phone number hacking/extortion. Moreover, a problem has occurred in that there are often no suitable means for the ID authentication checking process, and thus the process is not easy to handle. Therefore, in the disclosure, the problem described above will be solved through various embodiments.

In order to solve the problem described above, a method of a first terminal according to an embodiment includes: receiving an input for transferring a first profile installed in the first terminal; removing the first profile from a first eUICC; generating digital signature data of the first eUICC, relating to data including first profile information; generating an activation code including the signature data and the data including the first profile information; and transferring the activation code to a second terminal.

In order to solve the problem described above, a method of a second terminal according to an embodiment includes: receiving an activation code from the first terminal; transferring the activation code and digital signature data of a second eUICC to a profile server included in the activation code; and receiving the profile from the profile server and installing the profile in the second eUICC.

In order to solve the problem described above, a method of a profile server according to an embodiment includes: receiving the first profile information, the digital signature data of the first eUICC, and the digital signature data of the second eUICC from the second terminal; validating the digital signature data of the second eUICC; validating the digital signature data of the first eUICC; and transmitting the first profile to the second terminal.

In order to solve the problem described above, a method of a first terminal according to another embodiment includes: connecting a first eUICC in the first terminal to a third terminal through a switch; receiving a command to remove a first profile installed in the first eUICC from the third terminal; removing the first profile from the first eUICC; generating digital signature data of the first eUICC, relating to data including first profile information; and transferring information including the signature data and the data including the first profile information to the third terminal.

In order to solve the problem described above, a method of a third terminal according to another embodiment includes: connecting the third terminal to a first eUICC of a first terminal through a switch in the first terminal; receiving an input of transferring a first profile installed in the first eUICC; transferring a command to remove the first profile installed in the first eUICC to the first terminal; receiving a result of the removal of the first profile from the first terminal; receiving data including first profile information and digital signature data of the first eUICC, relating to the data including the first profile information; generating an activation code including the signature data and the data including the first profile information; and displaying the activation code on a screen of the third terminal, or transferring the activation code to a second terminal.

In order to solve the problem described above, a method of a second terminal according to an embodiment includes: receiving an activation code from the third terminal; transferring the activation code and digital signature data of a second eUICC to a profile server included in the activation code; and receiving the profile from the profile server and installing the profile in the second eUICC.

In order to solve the problem described above, a method of a profile server according to an embodiment includes: receiving the first profile information, the digital signature data of the first eUICC, and the digital signature data of the second eUICC from the second terminal; validating the digital signature data of the second eUICC; validating the digital signature data of the first eUICC; and transmitting the first profile to the second terminal.

In order to solve the problem described above, a method of a first terminal according to another embodiment includes: connecting a first eUICC in the first terminal to a third terminal through a switch; receiving a command to remove a first profile installed in the first eUICC from the third terminal; removing the first profile from the first eUICC; generating digital signature data of the first eUICC, relating to data including first profile information; and transferring information including the signature data and the data including the first profile information to the third terminal.

In order to solve the problem described above, a method of a third terminal according to another embodiment includes: connecting the third terminal to a first eUICC of a first terminal through a switch in the first terminal; receiving an input of transferring a first profile installed in the first eUICC; transferring a command to remove the first profile installed in the first eUICC to the first terminal; receiving a result of the removal of the first profile from the first terminal; receiving data including first profile information and digital signature data of the first eUICC, relating to the data including the first profile information; generating an activation code including the signature data and the data including the first profile information; and transferring the activation code to a second terminal.

In order to solve the problem described above, a method of a second terminal according to an embodiment includes: connecting a second eUICC in the second terminal to a third terminal through a switch; receiving an activation code from the third terminal; transferring the activation code and digital signature data of the second eUICC to a profile server included in the activation code; and receiving the profile from the profile server and installing the profile in the second eUICC.

In order to solve the problem described above, a method of a profile server according to an embodiment includes: receiving the first profile information, the digital signature data of the first eUICC, and the digital signature data of the second eUICC from the second terminal; validating the digital signature data of the second eUICC; validating the digital signature data of the first eUICC; and transmitting the first profile to the second terminal.

In order to solve the problem described above, a method of a first terminal according to another embodiment includes: connecting a first eUICC in the first terminal to a second terminal through a switch; receiving a command to remove a first profile installed in the first eUICC from the second terminal; removing the first profile from the first eUICC; generating digital signature data of the first eUICC, relating to data including first profile information; and transferring information including the signature data and the data including the first profile information to the second terminal.

In order to solve the problem described above, a method of a second terminal according to another embodiment includes: connecting the second terminal to a first eUICC of a first terminal through a switch in the first terminal and a switch in the second terminal; receiving an input of transferring a first profile installed in the first eUICC; transferring a command to remove the first profile installed in the first eUICC to the first terminal; receiving a result of the removal of the first profile from the first terminal; receiving digital signature data of the first eUICC, relating to data including first profile information; generating an activation code including the signature data and the data including the first profile information; transferring the activation code and digital signature data of a second eUICC to a profile server included in the activation code; and receiving the profile from the profile server and installing the profile in the second eUICC.

In order to solve the problem described above, a method of a profile server according to an embodiment includes: receiving the first profile information, the digital signature data of the first eUICC, and the digital signature data of the second eUICC from the second terminal; validating the digital signature data of the second eUICC; validating the digital signature data of the first eUICC; and transmitting the first profile to the second terminal.

In order to solve the problem described above, a method of a first terminal according to an embodiment includes: displaying a second terminal and a first profile on a screen; displaying a third terminal on the screen; inputting, by a user and on the screen, an intent to transfer the first profile of the second terminal to the third terminal; inputting, by the user, consent for the profile transfer on the screen; transferring a message indicating the transfer or removal of the first profile to the second terminal; receiving, from the second terminal, an activation code or information including a signature of a first eUICC included in the second terminal, which indicates that the first profile is removed; transferring the activation code including the information to the third terminal; and displaying the first profile installed in the third terminal on the screen.

In order to solve the problem described above, a method of a second terminal according to another embodiment includes: receiving a command to remove a first profile installed in a first eUICC in the second terminal from a first terminal; removing the first profile from the first eUICC; generating digital signature data of the first eUICC, relating to data including first profile information; and transferring an activation code or information including the signature data and the data including the first profile information to the first terminal.

In order to solve the problem described above, a method of a third terminal according to an embodiment includes: receiving an activation code from the first terminal; transferring the activation code and digital signature data of a second eUICC to a profile server included in the activation code; and receiving the profile from the profile server and installing the profile in the second eUICC.

In order to solve the problem described above, a method of a profile server according to an embodiment includes: receiving the first profile information, the digital signature data of the first eUICC, and the digital signature data of the second eUICC from the third terminal; validating the digital signature data of the second eUICC; validating the digital signature data of the first eUICC; and transmitting the first profile to the third terminal.

In order to solve the problem described above, a method of a first terminal according to an embodiment includes: displaying a second terminal and a first profile on a screen; displaying a cloud icon, or a menu for backing up a profile or a plan in a cloud on the screen; inputting, by a user and on the screen of the first terminal, an intent to back up the first profile of the second terminal in the cloud; transferring a message indicating transfer or removal of the first profile to the second terminal; receiving, from the second terminal, an activation code or information including a signature of a first eUICC included in the second terminal, which indicates that the first profile is removed; transferring the activation code or the information to a cloud server; and displaying the first profile or the activation code stored in the cloud on the screen.

In order to solve the problem described above, a method of a second terminal according to another embodiment includes: receiving a command to remove a first profile installed in a first eUICC in the second terminal from a first terminal; removing the first profile from the first eUICC; generating digital signature data of the first eUICC, relating to data including first profile information; and transferring an activation code or information including the signature data and the data including the first profile information to the first terminal.

In order to solve the problem described above, a method of a cloud server according to another embodiment includes receiving an activation code from a first terminal and storing the activation code in association with the first terminal or a user account.

In order to solve the problem described above, a method of a first terminal according to another embodiment includes: displaying a third terminal, a cloud server, and a first profile or an activation code stored in the cloud server on a screen; displaying a menu for restoring a profile or a plan in the cloud or a SIM icon stored in the cloud on the screen; inputting, by a user and on the screen of the first terminal, an intent to retrieve the profile or the activation code backed up in the cloud and install the profile or the activation code in the third terminal; and transferring the activation code to the third terminal.

In order to solve the problem described above, a method of a cloud server according to another embodiment includes: identifying user account information or terminal information of a first terminal which accessed the cloud server by transferring the user account information or terminal information; and transferring an activation code to the first terminal.

In order to solve the problem described above, a method of a third terminal according to an embodiment includes: receiving an activation code from the first terminal; transferring the activation code and digital signature data of a second eUICC to a profile server included in the activation code; and receiving the profile from the profile server and installing the profile in the second eUICC.

In order to solve the problem described above, a method of a profile server according to an embodiment includes: receiving the first profile information, the digital signature data of the first eUICC, and the digital signature data of the second eUICC from the third terminal; validating the digital signature data of the second eUICC; validating the digital signature data of the first eUICC; and transmitting the first profile to the third terminal.

Hereinafter, provided embodiments will be described through the drawings.

First Embodiment—Device Change from First Device to Second Device

Figure 2:
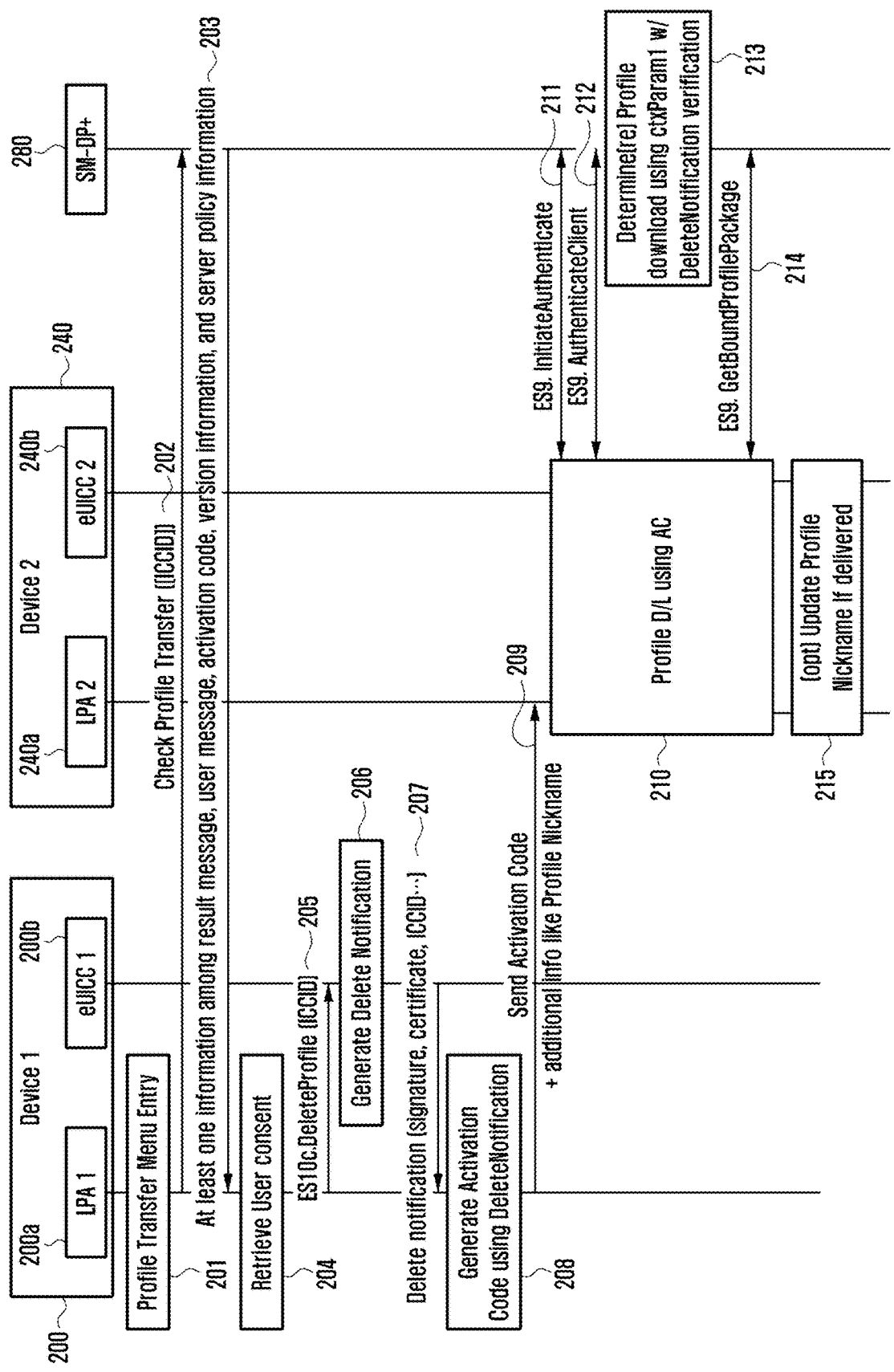
FIG. 2 illustrates an example of an operation procedure of a communication system to which an embodiment is applied.
Figure 3:
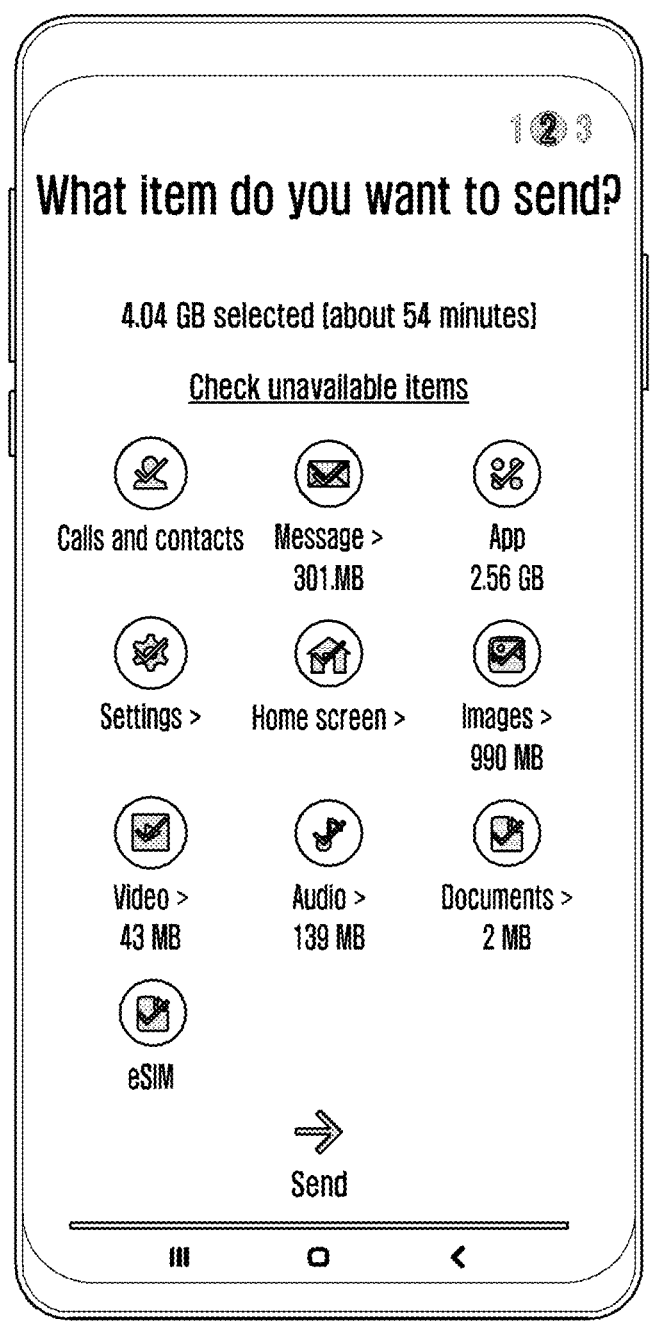
FIG. 3 illustrates an example of a terminal screen configuration of a communication system to which an embodiment is applied.

FIG. 1 illustrates a configuration for a device change from a first device to a second device, to which an embodiment is applied, FIG. 2 illustrates a process for a device change from a first device to a second device, to which an embodiment is applied, and FIG. 3 illustrates a UX for a device change from a first device to a second device, to which an embodiment is applied.

FIG. 1 illustrates an example of a configuration of a communication system to which an embodiment is applied.

Referring to FIG. 1, a first device 100 may download a profile from a profile server 110 and install the profile, may remove the installed profile to transfer the profile, and may provide information of the removed profile and validation information for validating that the profile is removed, to a second device 120.

The second device 120 may receive the profile information and the profile removal validation information from the first device 100, may transfer a request message including the corresponding pieces of information and a signature of the second device 120 to the profile server, and may receive a corresponding profile from the profile server 110 and install the profile.

The profile providing server may validate the removal of the profile that has been installed in the first device 100, in response to the request of the second device 120, and may transmit a corresponding profile to the second device 120 again to enable profile installation.

In addition, if a profile removal request event requesting the removal of a profile is received through an input unit (a user interface unit) of software or an application (e.g., a local profile assistant (LPA)) installed in a terminal or an electronic device to control a UICC or an eUICC, each of the first device 100 and the second device 120 according to an embodiment may remove the profile, and transmit a message indicating that the profile is removed, to the profile providing server. Therefore, the profile providing server can manage a profile that is previously generated to provide a communication service in the first device 100 by the profile providing server, such that the profile can be reused in the second device 120.

FIG. 2 illustrates an example of an operation procedure of a communication system to which the first embodiment is applied.

A system illustrated in FIG. 2 may include a first device 200, a second device 240, and a profile providing server 280. The profile providing server 280 may be SM-DP+. The first device 200 may include an LPA1 200a and an eUICC1 200b. The second device 240 may include an LPA2 240a and an eUICC2 240b.

Referring to FIG. 2, a user may enter a profile transfer menu in the device 200 that is to perform profile transfer (for convenience, referred to as a first device (an old device)) (operation 201). Alternatively, the user may enter a menu for managing a profile or a particular plan in the device, and may select a function indicating profile transfer among functions of managing the profile and plan, or enter an additional menu for operating the corresponding function.

The first device 200 may transfer a message inquiring whether to allow profile transfer to the SM-DP+ 280, so as to execute the profile transfer (operation 202). The message may include an integrated circuit card identifier (ICCID). In addition, the message may be a message for mutual authentication during a mutual authentication procedure between the first device 200 and the SM-DP+ 280. For example, the message may be at least one message among ES9.InitiateAuthenticateRequest or ES9.AuthenticateClientRequest. Operation 202 may be omitted according to a method of determining whether to allow profile transfer, which is configured in the SM-DP+ 280. In addition, the message inquiring whether to allow profile transfer may include or omit a particular profile ID (i.e., ICCID). In the case where a profile ID is omitted in the message, the SM-DP+ 280 may determine whether to allow profile transfer, according to a particular eUICC, a particular eUICC manufacturer, a particular eUICC version, a particular LPA version, whether an additional parameter exists in a message transmitted by an LPA, the version of the SM-DP+, a basic configuration of the SM-DP+, and a policy of each communication service provider.

Additionally, a mechanism of determining whether to allow profile transfer may be as follow.

1) a method of configuring, for the SM-DP+, allowance of profile transfer for all or a part of profiles.

2) a method in which, when a server of a communication company requests the SM-DP+ server to prepare profile downloading, the communication company configures whether to allow transfer of a corresponding profile (e.g., information configuring whether to allow profile transfer is included in the request for preparing profile downloading) The request for preparing profile downloading may correspond to an ES2+.DownloadOrder, ES2+.ConfirmOrder, or ES2+.ReleaseProfile command message. A message separately defined from a corresponding command message may include information configuring whether to allow profile transfer.

3) a method in which, when a device inquires to the SM-DP+ of a request for profile transfer, the SM-DP+ determines whether to allow profile transfer by inquiring to a server of a service provider every time when the request is inquired of.

4) a method in which, if a terminal checks version information (e.g., an SVN value) identified through message exchange between the terminal and the SM-DP+, and the version information satisfies a particular condition, the terminal determines that all the profiles installed in the SM-DP+ are allowed to be transferred.

5) a method in which a terminal checks a profile transfer allowance condition (e.g., a profile installed after a particular data. e.g., allowance of only a particular communication service provider code among profiles downloaded from the SM-DP+) identified at the time of message interworking between the terminal and the SM-DP+, and determines that all profiles satisfying the condition are allowed to be transferred.

If the request message of operation 202 is received, the SM-DP+ 280 may determine whether to allow transfer of a corresponding profile, and may transfer, to the first device 200, at least one of a result of the determination, a message to be shown to the user, an indicator indicating allowance or non-allowance, an indicator transferring whether to reuse the profile if the profile is allowed to be transferred, and an activation code or additional information required for receiving the activation code if a new profile is required to be newly issued and used (operation 203).

If the SM-DP+ 280 basically supports profile transfer, operation 202 may be omitted. Alternatively, operation 202 may be replaced with identifying version information of a particular SM-DP+ in order to check whether the SM-DP+ supports profile transfer. For example, the first device 200 may determine that the SM-DP+ 280 provides profile transfer for all the profiles, by using other indicator information or version information of the SM-DP+, which is transferred in response to an ES9.InitiateAuthenticateRequest message transmitted to the SM-DP+ by the first device.

If profile transfer is determined to be possible through the described various methods, the first device 200 may display a UI for obtaining a user opinion of consent for profile transfer by using information of operation 203 or information configured in the first device (operation 204). Operation 204 is not limited to displaying the UI, and may include various operations of the first device 200 for obtaining a user content. In addition, the process of obtaining a user content may be omitted. In this case, if a particular condition is satisfied according to a pre-configured implicit condition, a user may be determined to agree to profile transfer.

If the user agrees to profile transfer, the LPA1 200a of the first device 200 may transmit a message indicating profile removal to the eUICC1 200b (operation 205). The message indicating profile removal may be a DeleteProfile message. In response to the DeleteProfile message, the eUICC1 200b may remove a corresponding profile and create a removal identification message (operation 206). The removal identification message may correspond to a delete notification. Thereafter, the LPA1 200a of the first device 200 may obtain delete notification information from the eUICC1 200b (operation 207). The delete notification may include at least one of data including a server address, a profile id, a separator indicating that a profile is removed, a sequence number, or signature information of an eUICC having signed on the data. The first device 200 may create an activation code by using the delete notification (operation 208). The creation of the activation code may include the operations of: putting one of server addresses included in the delete notification in an RSP server address part of the activation code; and putting the entirety or a part of information included in the delete notification in an AC token part of the activation code.

In various embodiments, an operation of an LPA may be interpreted as an operation of a controller of a corresponding device or terminal. That is, the LPA may be replaced with the controller, or may be controlled according to an operation of the controller.

Information of the activation code created by the first device 200 may be transferred through Wi-Fi connection, near field communication (NFC) connection, ultra wide band (UWB) connection, Bluetooth connection, or cable connection between the first device 200 and the second device 240, or a QR code (operation 209). When the activation code information is transferred in operation 209, a profile nickname (or a plan name or label) of the corresponding profile may be additionally transferred. The profile nickname may correspond to information stored in the eUICC1 200b or information stored in the LPA1 200a, may be configured for the profile through the LPA1 200a by the user before the profile transfer operation illustrated in FIG. 2, or may be previously read and stored from the eUICC1 200b by the LPA1 200a. In addition, the nickname may be the name of a profile or a plan selected by the user at the time of profile selection in operation 201.

The second device 240 may download a profile from the SM-DP+ 280 by using the transferred activation code information (operation 210). Operation 210 may be described as follows in more detail with respect to operations 211 to 214.

The second device 240 may transfer a first authentication request message (e.g., an ES9.InitiateAuthenticate Request) to the SM-DP+ 280 to start a mutual authentication process between the second device 240 and the SM-DP+ 280 (operation 211). Before the second device 240 transfers the information received in operation 209 to the SM-DP+ 280, in a process in which the second device 240 authenticates the SM-DP+ 280, the second device 240 may generate a random value, include the random value in information, and transfer the information to the SM-DP+ 280. The SM-DP+ 280 may generate a signature value of the SM-DP+ 280 with respect to the information including the random value, and transfer the signature value together with a server certificate to the second device 240. The eUICC2 240b of the second device 240 may verify the signature value to authenticate the SM-DP+ 280. If the SM-DP+ 280 is authenticated, the second device 240 may transmit a second authentication request message (e.g., an ES9.AuthenticateClientRequest message) to the SM-DP+ 280 so that the eUICC2 240b of the second device 240 is authenticated by the SM-DP+ 280 in return. Additionally, the second device may transmit the ES9.AuthenticateClientRequest message after including the activation code information in the message (operation 212). As described above, the activation code information may include an entirety or a part of the delete notification information. If the corresponding information is received, the SM-DP+ 280 may perform operations including an operation of authenticating signature information of the delete notification information, and an operation of authenticating a signature of the eUICC of the second device 240, which is included in the ES9.AuthenticateClientRequest, so as to determine whether to download a profile corresponding to the removed profile in the second device 240 (operation 213). The SM-DP+ may transfer an AuthenticateClient Response message including a result determined by operation 213 to the second device 240.

If a response for accepting profile downloading is received, the second device 240 may request the SM-DP+ 280 for profile downloading by using a profile downloading request message (e.g., ES9.GetBoundProfilePackage). If the message is received, the SM-DP+ 280 may transmit an encrypted profile package corresponding to the message (operation 214). Thereafter, the second device 240 may install the corresponding profile in the eUICC2 240b of the second device 240.

If profile nickname information (or a plan name or a plan label) is transferred together to the second device 240 in operation 209, the second device 240 may perform profile downloading and installation of operation 210, and then update a profile nickname of the corresponding profile into the profile nickname transferred in operation 209 (operation 215). In a case where a function as described above is used, when the procedure of transferring the profile of the first device 200 to the second device 240 is performed, there is an advantage in that the second device 240 is not required to re-perform configuration of individual information such as a plan name configured for each profile by the user in the first device 200.

FIG. 3 illustrates an example of a terminal screen configuration of a communication system to which an embodiment is applied.

Referring to FIG. 3, when a first device is changed to a second device, various information may be selected to transmit user information of the first device to the second device. On a screen of the first device, a user may input whether to include an eSIM profile in information to be transmitted. If the eSIM is selected, the first device may perform the operation illustrated in FIG. 2 to transmit activation code information required for profile transfer to the second device, and may additionally transfer other items selected by the user as shown in FIG. 3. An example of the other items may include at least one of calls and contacts, text messages, app installation information, various setting values, home screen configuration, stored images, stored videos, stored voice data, or stored document data.

The entire device change stages including the UX screen may be as below.

1) and 2) each of the first device and the second device may execute a terminal integrated transfer application.

3) each of the first device and the second device may be connected to each other through the terminal integrated transfer applications. The first device and the second device may be connected by using short-range communication such as NFC, Wi-Fi, Bluetooth, and UWB, and may be connected through a server.

4) the first device may transfer, to the second device, a user environment of a terminal, such as contacts, installed app list information, and data in app of the terminal. Stage 4) may correspond to the above description of the screen in FIG. 3.

5) in addition, the first device may perform a profile transfer procedure on each of profiles installed in an eUICC of the first device according to all or a part of the operations of the profile transfer procedures described in the above embodiments. For effective transfer, one or multiple pieces of delete notification information may be transferred through the connection between the apps established in stage 3) instead of using a method of displaying corresponding information through a QR code, mentioned in the above embodiments. Instead of displaying information through a QR code, the information may be transferred to the second device through Wi-Fi communication, UWB communication, a server or short-range communication, such as NFC, Bluetooth.

6) the second device may set an environment similar to or identical to that of the first device by using information such as contacts received from the first device in stage 4).

7) in addition, the second device may install corresponding profiles with respect to the one or multiple of delete notifications received in stage 5), respectively. The delete notification information may be converted into an AC token type so as to be used. In addition, the second device may apply profile nicknames received together with respect to the profiles, to change a profile name, or a plan name or label.

Figure 4:
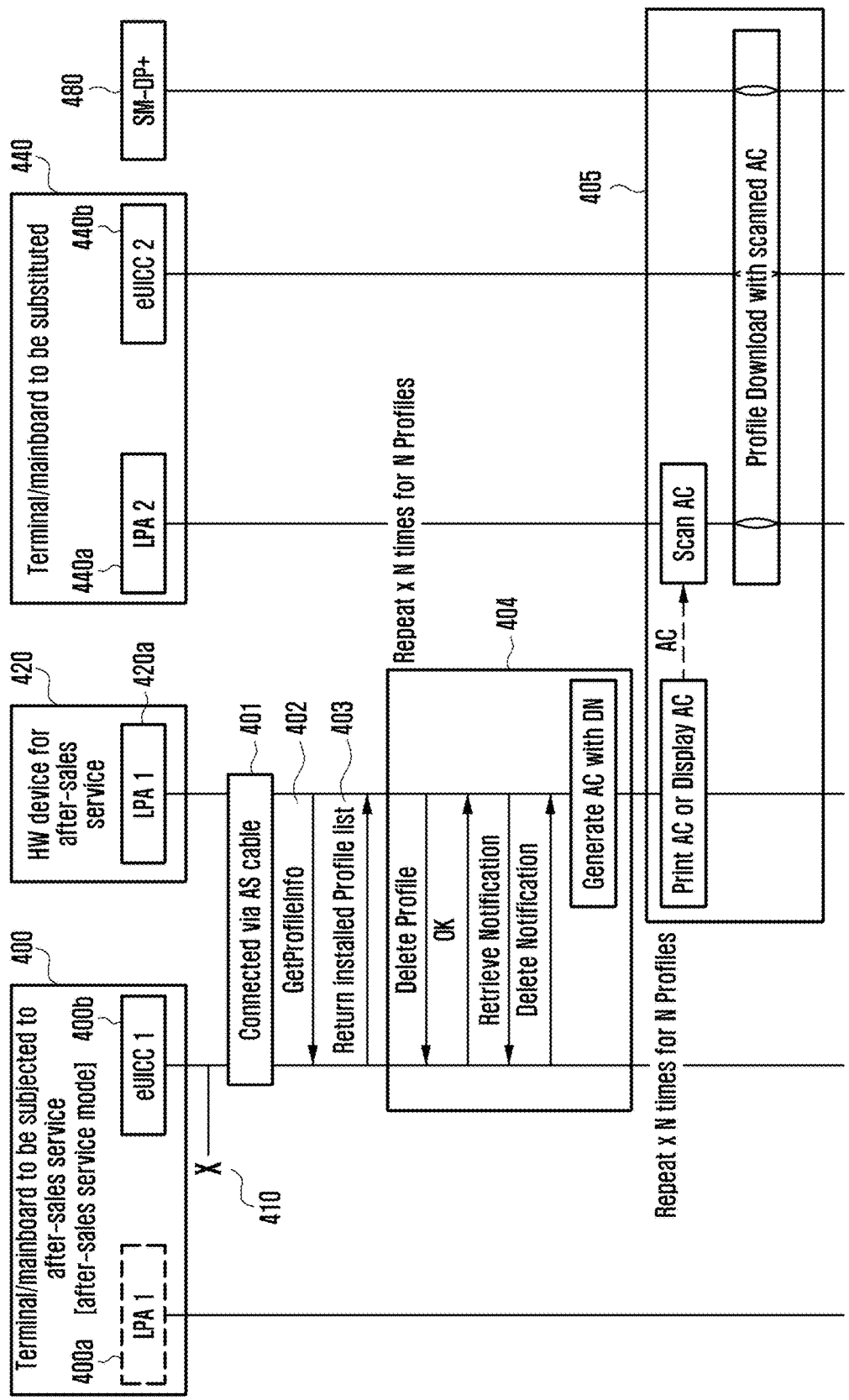
FIG. 4 illustrates an example of a procedure of reinstalling a profile from a first device having a switch mounted therein to a second device according to an embodiment.
Figure 5A:
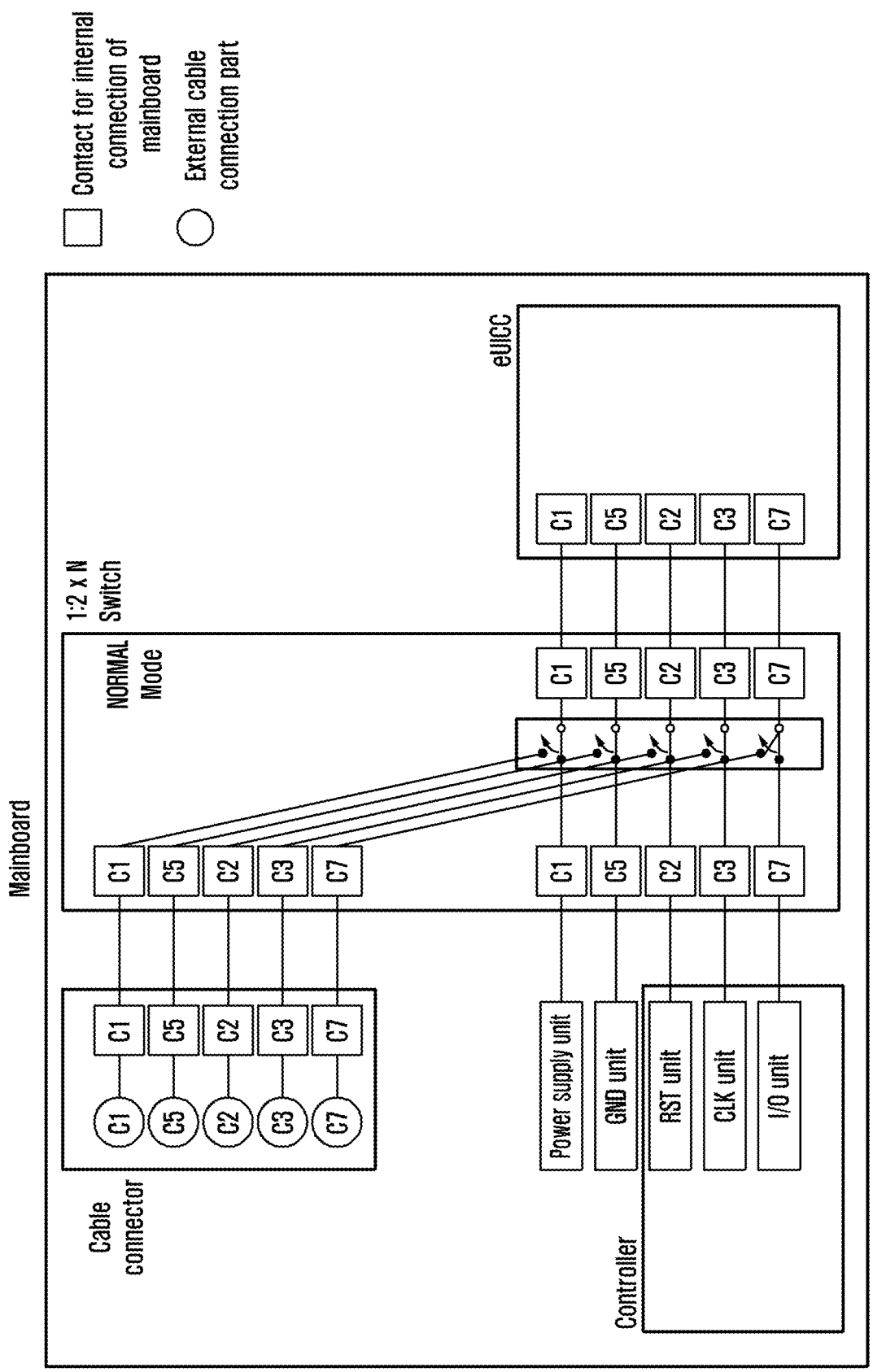
FIG. 5A illustrates an example of an operation of a switch of a first device for the procedure illustrated in FIG. 4.
Figure 5B:
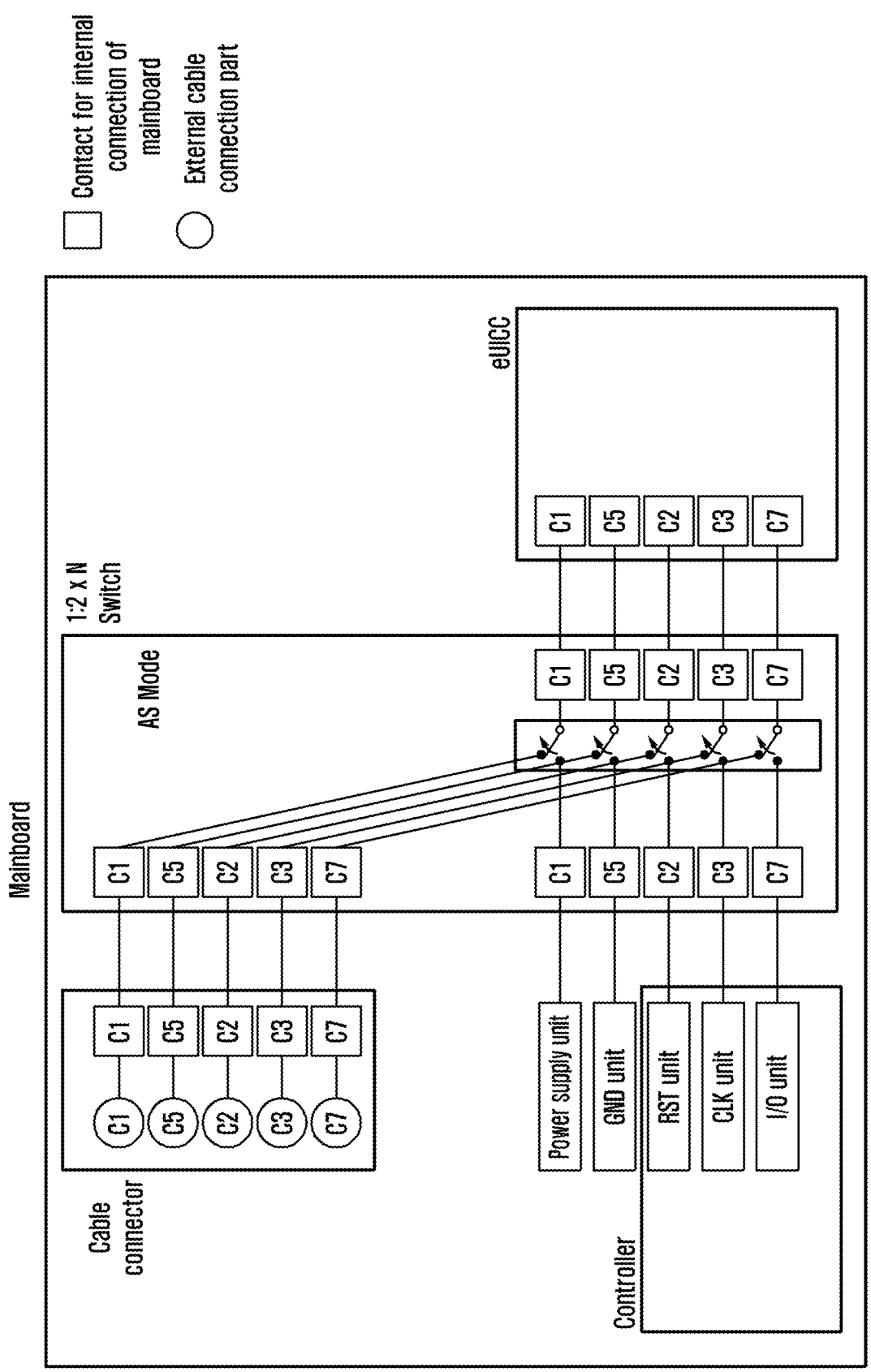
FIG. 5B illustrates an example of an operation of a switch of a first device for the procedure illustrated in FIG. 4.
Figure 5C:
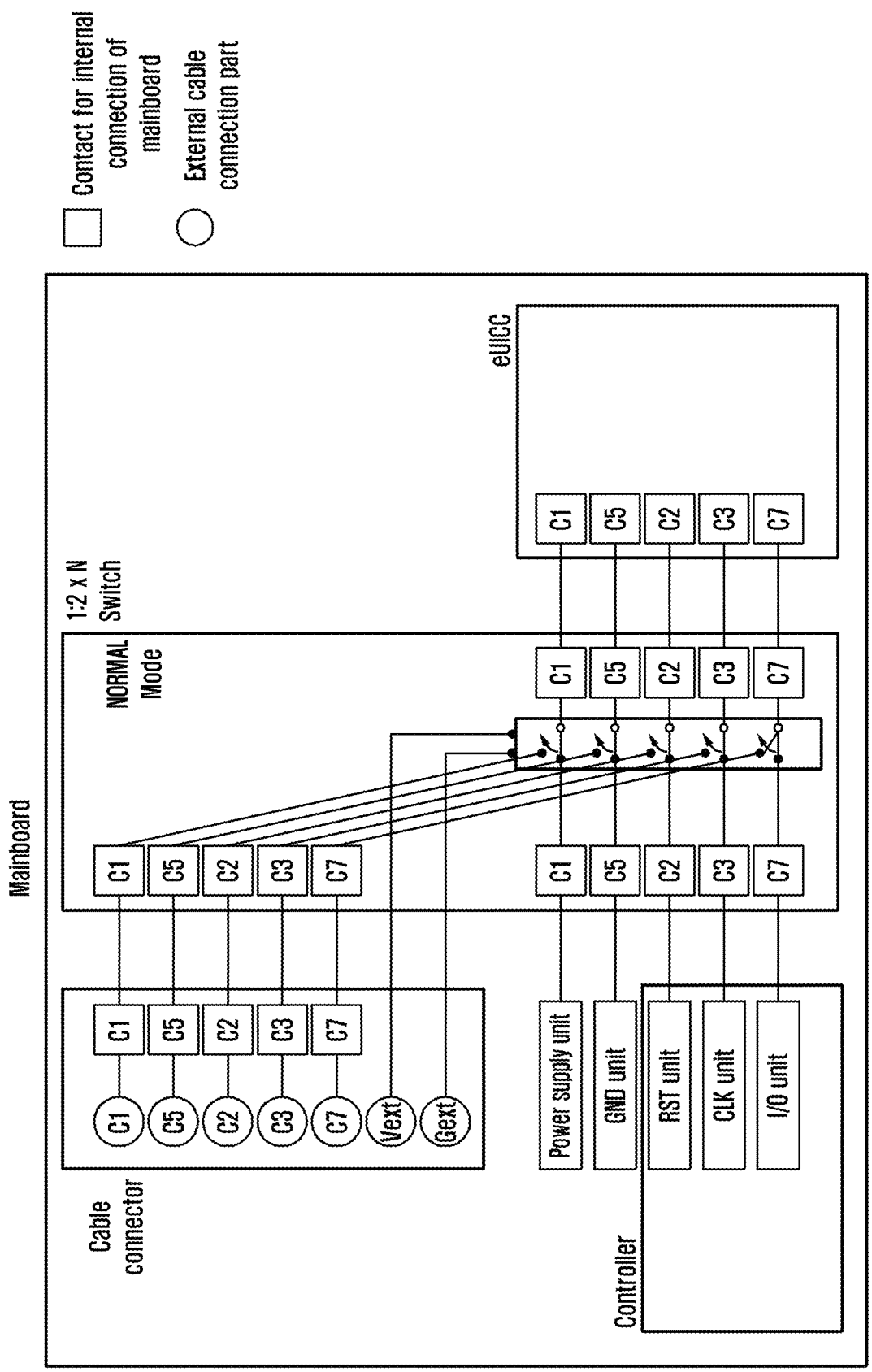
FIG. 5C illustrates an example of an operation of a switch of a first device for the procedure illustrated in FIG. 4.

Second Embodiment-Device Change from Switch-Embedded First Device to Second Device Through Third Device FIG. 4 illustrates a procedure of changing a first device having a switch-embedded structure to a second device through a third device according to another embodiment, FIG. 5A illustrates an operation structure of the switch according to another embodiment, FIG. 5B illustrates an operation structure of the switch according to another embodiment, and FIG. 5C illustrates an operation structure of the switch according to another embodiment.

FIG. 4 illustrates an example of a procedure of reinstalling a profile from a first device having a switch mounted therein to a second device according to an embodiment.

A system illustrated in FIG. 4 may include a first device 400, a second device 440, a third device 420, and a profile providing server 280. The first device 400 may be a terminal to be subjected to after-sales service. The second device 440 may be a terminal to be substituted. The third device 420 may be a hardware (HW) device for after-sales service. The profile providing server 480 may be SM-DP+. The first device 400 may include an LPA1 400*a* and an eUICC1 400*b*. The second device 440 may include an LPA2 440*a* and an eUICC2 440*b*.

Referring to FIG. 4, the terminal 400 (e.g., a first terminal) to be subjected to after-sales service includes the LPA1 400*a* and the eUICC1 400*b*. The LPA1 400*a* may be connected to the eUICC1 400*b* through a switch. If the switch is in a normal mode, the LPA1 400*a* may be connected to the switch. If the switch is in an after-sales service mode, the LPA1 400*a* and the eUICC1 400*b* may be not connected to each other, and the eUICC1 400*b* may be connected to an external connector connection part.

The external connector part may be a SIM slot in which a SIM card can be inserted. That is, if the switch is in an after-sales service mode, the eUICC in the terminal may be connected to a pin of a SIM slot connected to the switch, through the switch. The operation of the after-sales service mode and the normal mode is described in more detail with reference to FIGS. 5A, 5B, and 5C.

As shown in FIG. 4, "X" indicates that the eUICC1 400*b* and the LPA1 400*a* are not connected to each other (operation 410). The terms "normal mode" and "after-sales service mode" for the switch are arbitrarily named, and it should be noted that the terms are arbitrary names given to describe the operation of the switch in the following description. The terminal to be subjected to after-sales service is referred to as a first device 400 for convenience. The first device 400 in an after-sales service mode may be connected to the HW device for after-sales service through a cable (operation 401). The HW device for after-sales service is referred to as a third device 420 for convenience. One side or both sides of the cable may have a shape allowing the cable to be inserted in a SIM card slot. If each of both ends has a shape allowing the cable to be inserted in a SIM card slot, both ends of the cable may be inserted in and connected to the SIM card slots of the first device 400 and the third device 420, respectively. If the first device 400 is connected to the third device 420, an LPA1 420*a* of the third device may be connected to the eUICC1 400*b* of the first device. A detailed connection method is described with reference to FIGS. 5A, 5B, and 5C.

Thereafter, the third device 420 may retrieve profile information from the eUICC1 400*b* of the first device 400. For example, the LPA1 420*a* of the third device 420 may transfer a profile information request message (e.g., GetProfileInfo) to the eUICC1 400*b* of the first device 400 (operation 402). Thereafter, the LPA1 420*a* of the third device 420 may receive information (e.g., a list of operational profiles) of profiles installed in the eUICC1 400*b* of the first device 400 (operation 403).

After the reception, the third device 420 may remove profiles to be moved from the eUICC1 400*b* of the first device 400, and receive a removal identification message (operation 404). The removal identification message may correspond to a delete notification. The third device may create activation codes relating to the profiles. Profile removal and information of the delete notification may refer to the description illustrated in FIG. 2.

The third device 420 may print the created activation codes in a QR code type, may display the activation codes on a screen of the third device 420, or may connect to the second device 440, that is a terminal to be substituted, and transfer the activation codes to the second device (operation 405). A method of connecting and transferring to the second device 440 is described in detail with reference to FIG. 6.

In the following description, it is assumed that a printed or displayed QR code is scanned through the LPA2 440*a* of the second device 440.

After the activation codes are scanned through QR code scanning, the second device 440 receives profiles from the SM-DP+ 460 and installs the profiles through the procedure of operation 210 in FIG. 2 (operation 405).

Through the method described above, even if there is a problem in a main element, such as an application processor, a communication processor, or a communication function for operating the LPA1 400*a* of the first device 400, a profile installed in the eUICC1 400*b* of the first device 400 may be moved to another device by using the LPA 420*a* of the third device 420. For example, an after-sales service center of a terminal manufacturer may connect a cable to the first device 400 that does not turn on, so as to move a profile installed in the first device 400 to the terminal 420 (e.g., the third device) to be substituted.

FIG. 5A illustrates an example of an operation of a switch of a first device for the procedure illustrated in FIG. 4, FIG. 5B illustrates an example of an operation of a switch of a first device for the procedure illustrated in FIG. 4, and FIG. 5C illustrates an example of an operation of a switch of a first device for the procedure illustrated in FIG. 4.

Referring to FIGS. 5A, 5B, and 5C, an eUICC may be connected to a controller or a cable connector through a switch. The cable connector may correspond to pins of a USIM slot.

More specifically, pin terminals of the eUICC may be connected to the controller and a power supply unit in a mainboard, or all pin terminals may be connected to an external cable connector connection part. The external cable connector connection part may be a SIM card slot.

If the switch is in a normal mode, the eUICC may be connected to the controller connected to the same mainboard connected to the eUICC. The controller may include an LPA, or may transfer a control command for the LPA to the eUICC (see FIG. 5A).

In addition, if the switch is in an after-sales service mode, the eUICC may be connected to the external cable connector connection part connected to the same mainboard connected to the eUICC (see FIG. 5B).

The operations for switching the modes of the switch may employ a mechanical method of controlling the switch through a controller mechanically connected to the switch, or may employ an electrical method of controlling the switch through an electrical signal applied thereto. The switch may be operated through the following method including an electrical method.

Example of Operation Method of Switch

1) Physical switch: if the physical switch is turned on/off (one switch is controlled), six individual switches are controlled at the same time.

2) Electrical switch: A power supply unit of the switch is connected to the power supply unit of the mainboard. If the power supply unit is turned on, terminals of the eUICC are connected to terminals of the controller, and if the power supply unit is turned off, terminals of the eUICC are connected to the external cable connection part, so that the connections are changed.

3) Electrical switch 2: Power of the power supply unit of the switch may be supplied from the cable connection part. If the power is not supplied, terminals of the eUICC are connected to terminals of the controller in the mainboard, and if the power is supplied, terminals of the eUICC are connected to the external cable connection part.

4) Electrical switch 3: Power of the power supply unit of the switch may be supplied from the cable connection part. If power is not supplied, terminals of the eUICC may be connected to terminals of the controller in the mainboard, and if power is supplied, terminals of the eUICC may be connected to the external cable connection part or connected to the terminals of the controller according to a separate signal supplied from the external cable connection part.

FIG. 5C shows a configuration of a switch and a mainboard for performing an example of an electrical switch control method. In comparison with the mainboards illustrated in FIGS. 5A and 5B, a switch of a mainboard illustrated in FIG. 5C is connected to at least one of an external power supply or signal unit, or a ground unit through an external cable connector, so that the switch is operated according to an external voltage or signal.

Through various switch connection configuration examples as described above, an installed profile of an eUICC can be transferred to an external device even if a controller is disabled.

Figure 6:
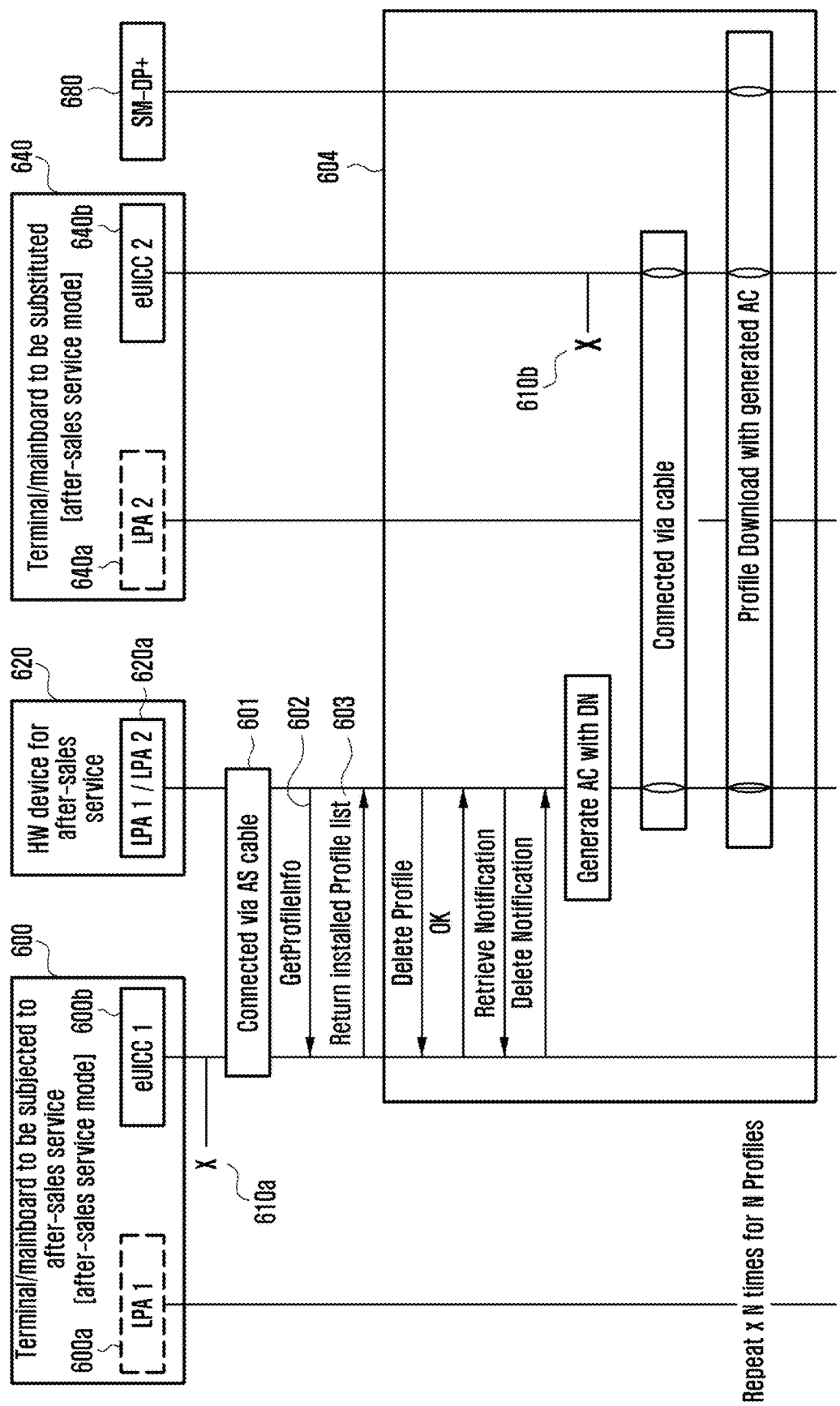
FIG. 6 illustrates an example of a procedure of reinstalling a profile from a first device having a switch mounted therein to a second device having a switch mounted therein according to an embodiment.

Third Embodiment-Device Change from
Switch-Embedded First Device to
Switch-Embedded Second Device Through Third
Device FIG. 6 illustrates a procedure of changing a first device having a switch-embedded structure to a switch-embedded second device through a third device and an operation structure of the switch according to another embodiment.

A system illustrated in FIG. 6 may include a first device 600, a second device 640, a third device 620, and a profile providing server 680. The first device 600 may be a terminal to be subjected to after-sales service. The second device 640 may be a terminal to be substituted. The third device 620 may be a hardware (HW) device for after-sales service. The profile providing server 680 may be SM-DP+. The first device 600 may include an LPA1 600a and an eUICC1 600b. The second device 640 may include an LPA2 640a and an eUICC2 640b.

Referring to FIG. 6, in comparison with the procedure illustrated in FIG. 4, if the third device 620 includes the switch structures illustrated in FIGS. 5A, 5B, and 5C, a more convenient device change is possible. As shown in FIG. 6, "X" indicates that the eUICC1 600b and the LPA1 600a are not connected to each other (operation 610a). In addition, "X" indicates that the eUICC2 640b and the LPA2 640a are not connected to each other (operation 610b).

That is, the eUICC1 600b of the first device 600 may be connected to the HW device 620 for after-sales service through an LPA1/LPA2 620a of the HW device for after-sales service (operation 601).

Thereafter, the third device 620 may retrieve profile information from the eUICC1 600b of the first device 600. For example, the LPA1/LPA2 620a of the third device 620 may transfer a profile information request message (e.g., GetProfileInfo) to the eUICC1 600b of the first device 600 (operation 602). Thereafter, the LPA1/LPA2 620a of the third device 620 may receive information (e.g., a list of operational profiles) of profiles installed in the eUICC1 600b of the first device 600 (operation 603).

The third device may obtain an activation code corresponding to a profile installed in the eUICC1 600b. Similarly, the third device may be connected to the eUICC2 640b of the second device 640 through the LPA1/LPA2 620a of the HW device 620 (e.g., the third device) for after-sales service, and then may install a profile in the eUICC2 640b by using the activation code through a control of the HW device 620 for after-sales service (operation 604).

Figure 7:
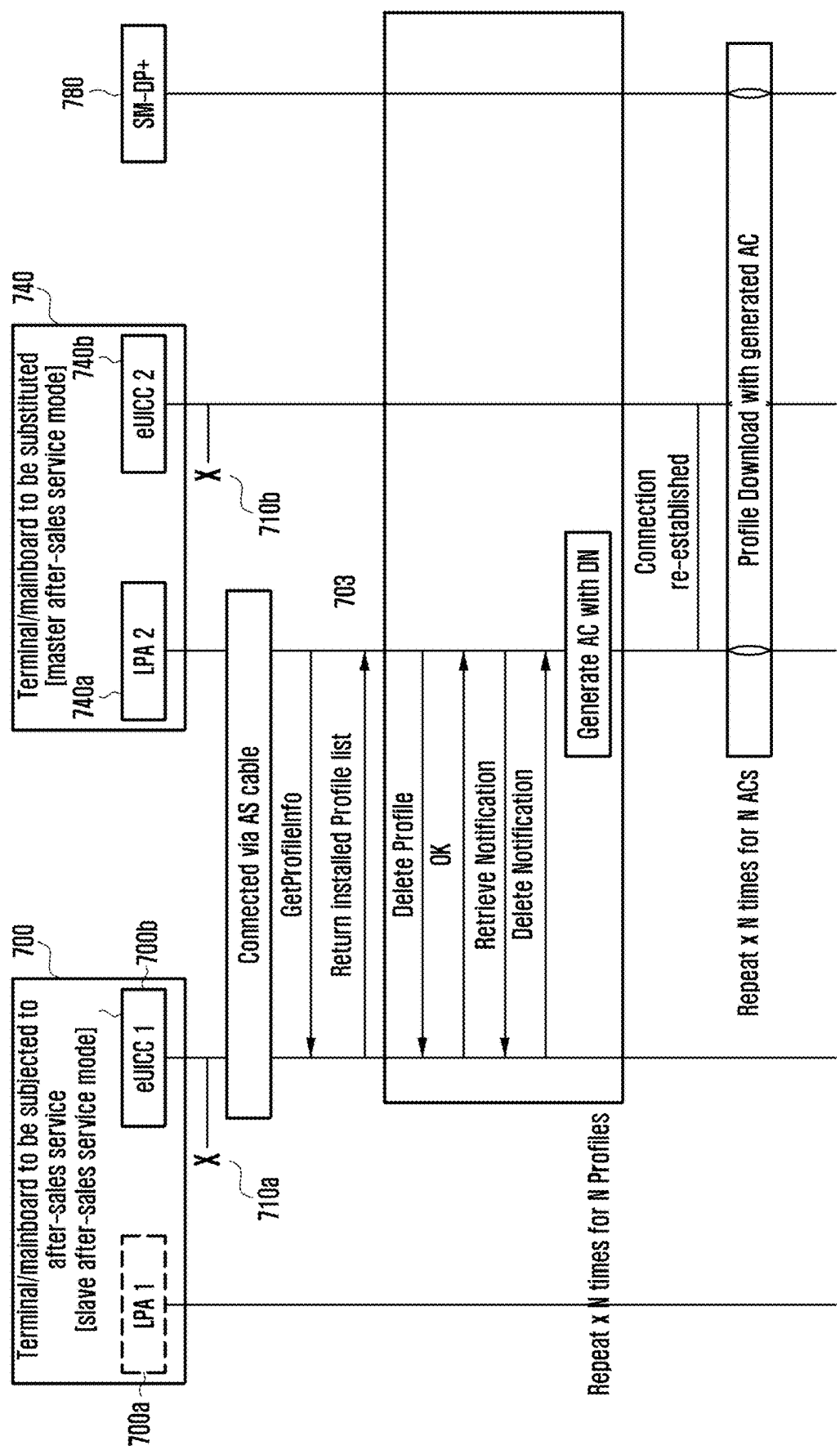
FIG. 7 illustrates another example of a procedure of transferring a profile from a first device having a switch mounted therein to a second device having a switch mounted therein, and reinstalling the profile in the second device according to an embodiment.
Figure 8A:
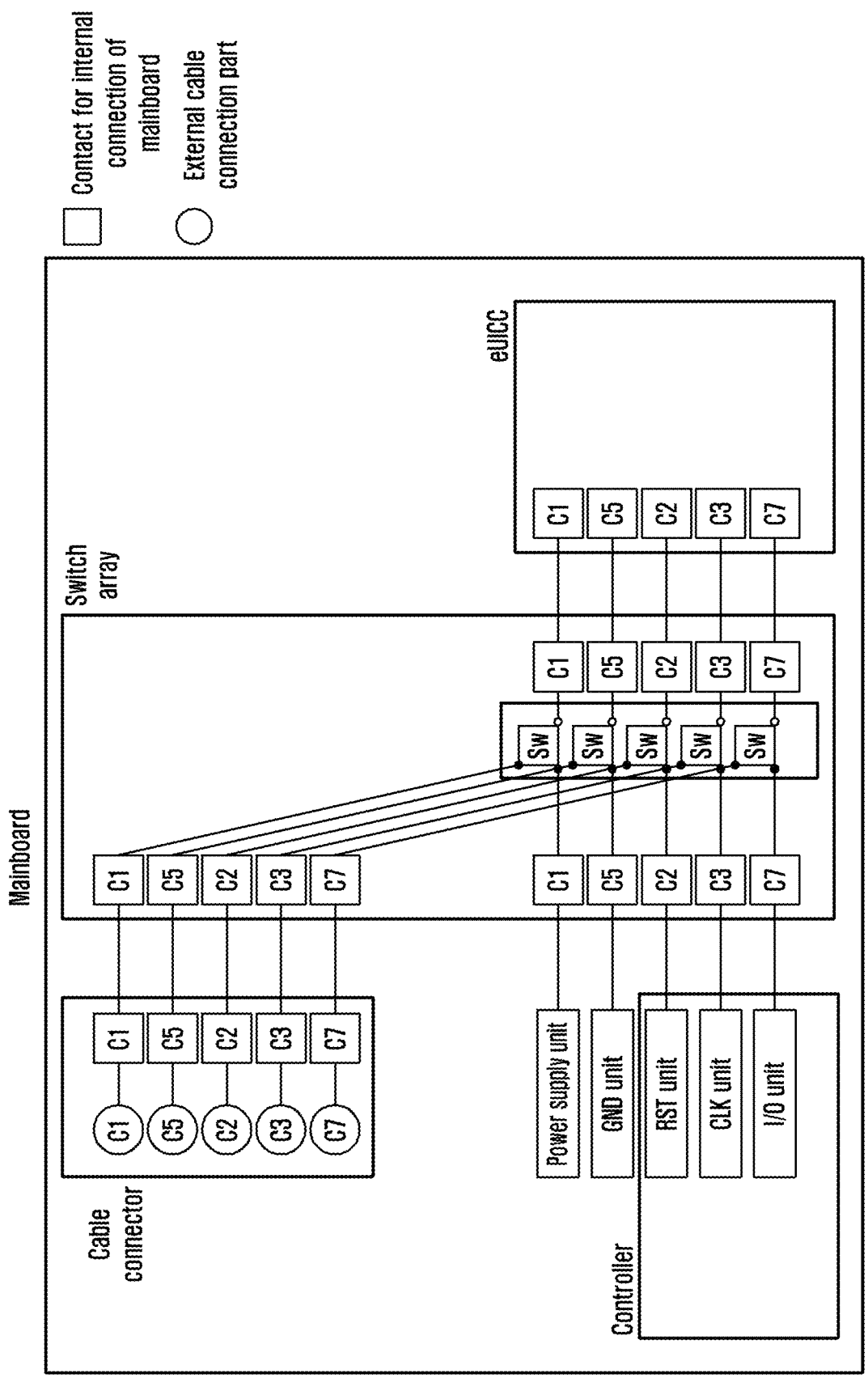
FIG. 8A illustrates an example of an operation of the switches of the first device and the second device for the procedure illustrated in FIG. 7.
Figure 8B:
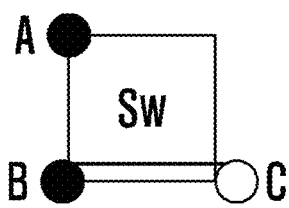
FIG. 8B illustrates a detailed example of an operation of the switches of the first device and the second device for the procedure illustrated in FIG. 7.
Figure 8B:
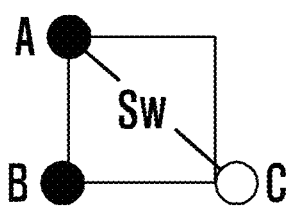
Figure 8B:
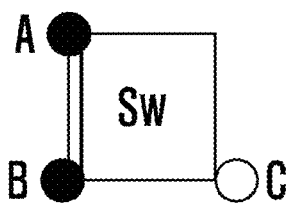

Fourth Embodiment-Device Change from
Switch-Embedded First Device to
Switch-Embedded Second Device without Going
Through Third Device FIG. 7 illustrates a procedure of directly changing a first device having a switch-embedded structure to a second device having a switch-embedded structure according to another embodiment, FIG. 8A illustrates a switch operation structure according to another embodiment, and FIG. 8B illustrates a switch detailed-operation structure according to another embodiment.

FIG. 7 illustrates another example of a procedure of transferring a profile from a first device 700 having a switch mounted therein to a second device 740 having a switch mounted therein, and reinstalling the profile in the second device according to an embodiment.

A system illustrated in FIG. 7 may include a first device 700, a second device 740, and a profile providing server 780. The profile providing server 780 may be SM-DP+. The first device 400 may be a terminal subjected to after-sales service. The second device 440 may be a terminal to be substituted. The first device 700 may include an LPA1 700a and an eUICC1 700b. The second device 740 may include an LPA2 740a and an eUICC2 740b.

Referring to FIG. 7, unlike the operations illustrated in FIGS. 4 and 6, a profile is directly transferred from the first device 700 to the second device 740. More specifically, the operation of the first device 700 is identical to the operations illustrated in FIGS. 4 and 6, and the second device 740 serves as the HW device 620 for after-sales service in FIG. 6.

That is, the second device 740 may be connected to the eUICC1 700b of the first device 700 that is in an after-sales service mode. The operation of the second device 740 may be named a master after-sales service mode. If the second device 740 in the master after-sales service mode and the first device 700 in the after-sales service mode (or slave after-sales service mode) are connected to each other, the eUICC1 700b of the first device 700 may be controlled through the LPA2 740a of the second device 740. After the connection, similarly to the operations performed by the HW devices 420 and 620 for after-sales service in FIGS. 4 and 6, the second device 740 may transfer a command to remove a profile of the eUICC1 700b of the first device 700 to the eUICC1 700b, and receive a delete notification from the eUICC1 700b to receive an activation code. Thereafter, the second device 740 may receive a profile from the SM-DP+ 780 in the eUICC2 740b of the second device 740 by using the activation code, and install the profile.

FIG. 8A illustrates an example of an operation of the switch of the second device for the procedure illustrated in FIG. 7.

Referring to FIG. 8A, a controller of the second device may be connected to an external cable connection part in a master after-sales service mode. The external cable connection part may be a SIM slot.

The switch illustrated in FIG. 8A may include a multiple-switch structure in which several switches for individual pin connection are integrated. An example of an operation of an individual switch may be identical to the operation illustrated in FIG. 8B.

Referring to FIG. 8B, a detailed example of a switch of the second device is illustrated.

In a normal mode, a mainboard controller part (B) and an eUICC part (C) of the switch are connected to each other.

In a slave after-sales service mode, or an after-sales service mode, an external connector connection part (A) and the eUICC (C) of the switch are connected to each other.

In a master after-sales service mode, the mainboard controller part (B) and the external connector connection part (A) are connected to each other. The switch may implement two or more operational modes among the three modes, to support the device change procedures illustrated in FIGS. 4, 6, and 7.

Figure 9A:
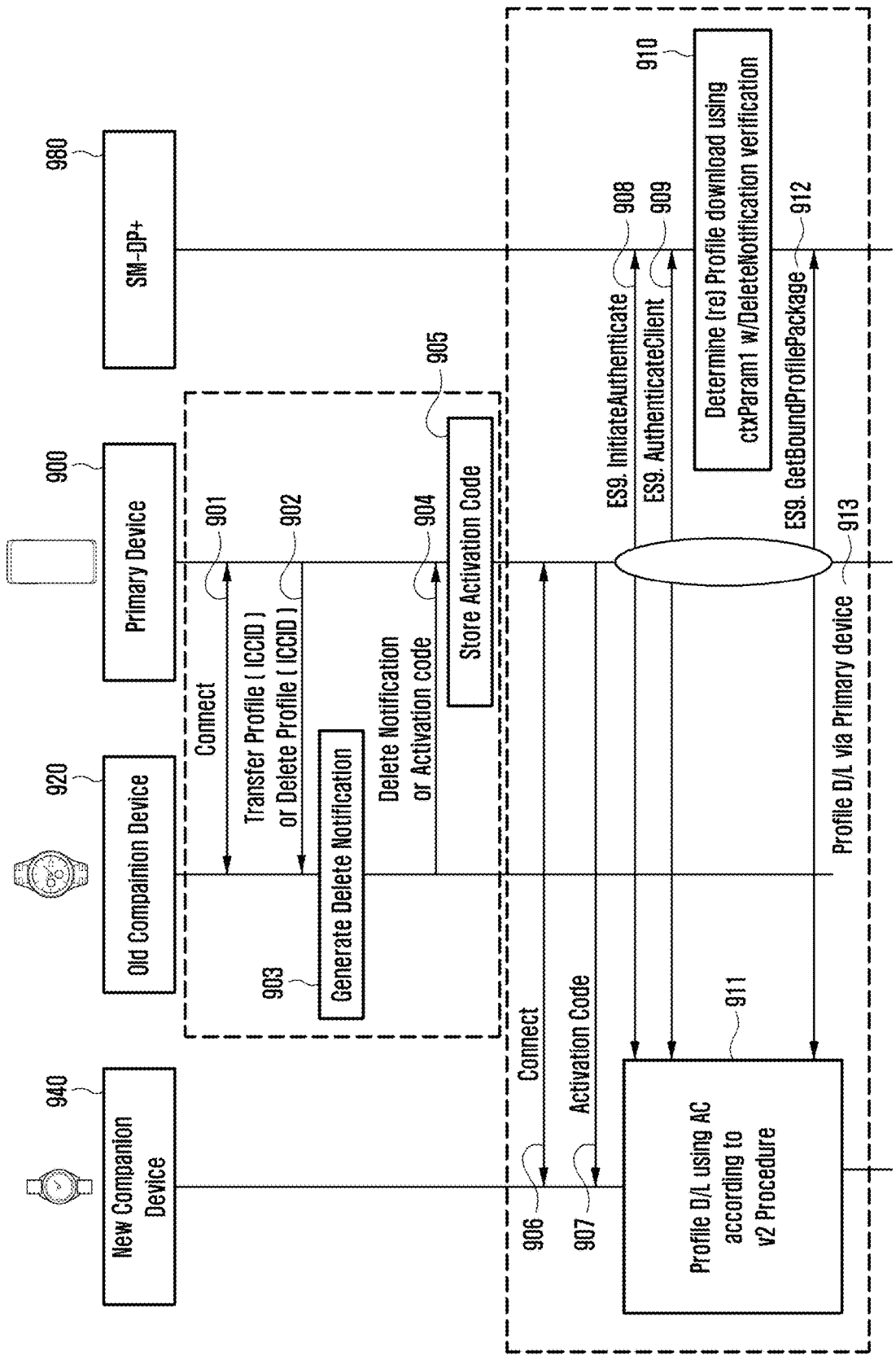
FIG. 9A illustrates an operation of transferring a profile from a first peripheral device to a second peripheral device and reinstalling the profile by using a primary device according to an embodiment.
Figure 9B:
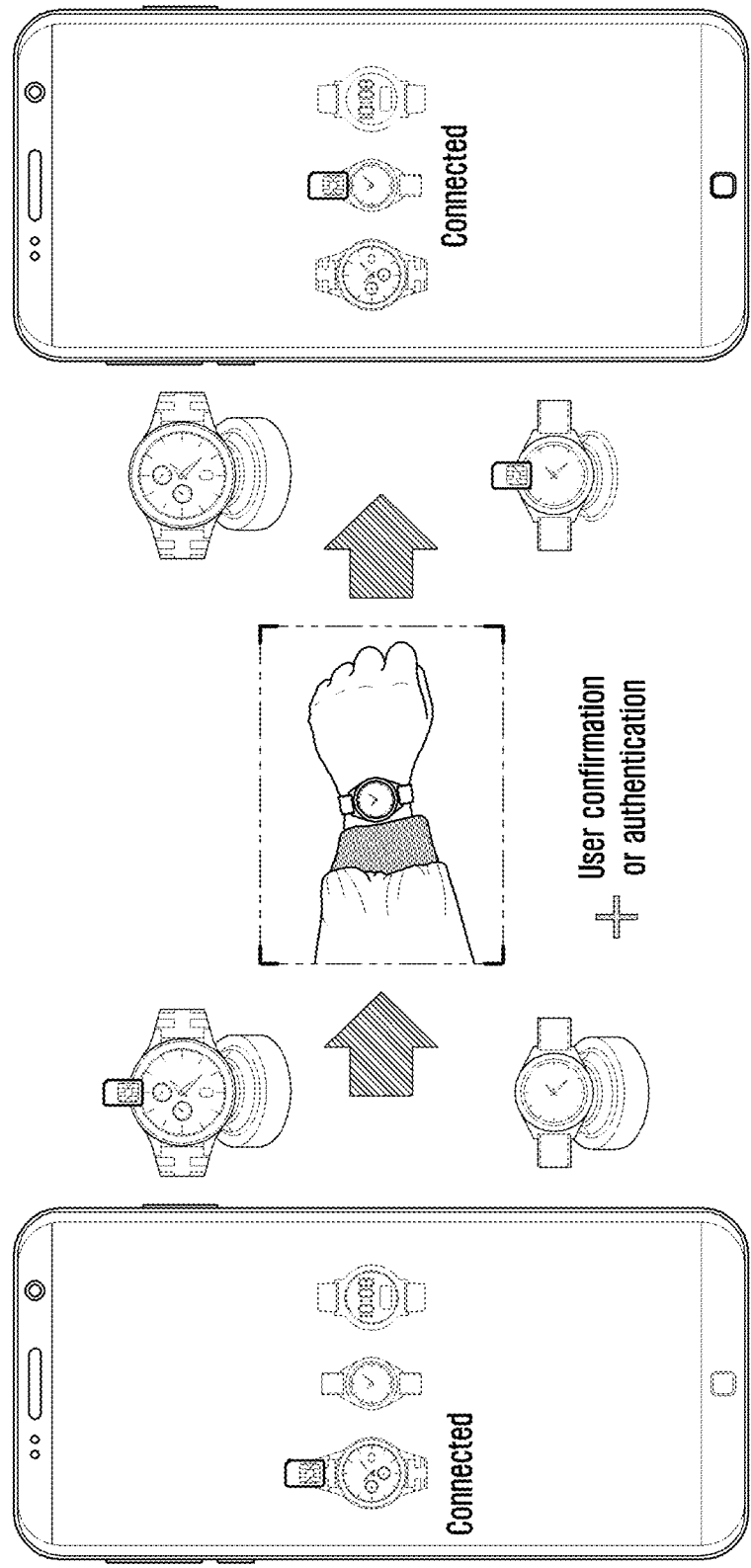
FIG. 9B illustrates an example of a user UX of a device during the operation illustrated in FIG. 9A.

Fifth Embodiment-Device Change from First Peripheral Device to Second Peripheral Device Through Primary Device FIG. 9A illustrates an operation of transferring a profile from a first peripheral device to a second peripheral device and re-installing the profile in the second peripheral device by using a primary device according to another embodiment, FIG. 9B illustrates an example of a user UX of a device according to another embodiment, and FIG. 9C illustrates another example of a user UX of the device according to another embodiment.

FIG. 9A illustrates a procedure of controlling profile transfer between multiple peripheral devices by a primary device as an embodiment.

A system illustrated in FIG. 9A may include a primary device 900, a first peripheral device 920, a second peripheral device 940, and a profile providing server 980. The profile providing server 980 may be SM-DP+. The primary device 900, the first peripheral device 920, and the second peripheral device 940 may be called a first device, a second device, and a third device, respectively.

Referring to FIG. 9A, the primary device 900 may be connected to one or more peripheral devices 920 and 940. The connection may be 1) a connection through short-range communication such as Bluetooth, Bluetooth low energy (BLE), ultra wide band (UWB), near field communication (NFC), and Wi-Fi, 2) a direct connection between a device and a device through long-distance IP communication, or 3) an indirect connection in which the peripheral devices 920 and 940 and the primary device 900 are connected to separate servers, respectively. In addition, the connection may be 4) a connection between the peripheral devices 920 and 940 and the primary device 900 through a wired cable, 5) a connection that is not a direct connection between the peripheral devices 920 and 940 and the primary device 900, and is established by manually inputting, in the primary device 900, information generated or shown by the peripheral devices 920 and 940, or manually inputting, in the peripheral devices 920 and 940, information generated or shown by the primary device 900, or 6) a connection that is not a direct connection between the peripheral devices 920 and 940 and the primary device 900, and is established by displaying information generated by the peripheral devices 920 and 940 in a QR code type or a bar code type, and inputting the displayed information in the primary device 900 by using a camera of the primary device 900, or displaying information generated by the primary device 900 in a QR code type or a bar code type, and inputting the displayed information in the peripheral devices 920 and 940 by using cameras of the peripheral devices 920 and 940. Transferring information between the primary device 900 and the peripheral devices 920 and 940 as illustrated in FIG. 9A may follow the connection methods described above.

First, the primary device 900 may be connected to one (the first peripheral device or an old peripheral device 920) of the peripheral devices (operation 901). For example, the primary device 900 may be a smart phone. The primary device 900 may transfer information for profile transfer to the first peripheral device 920 (operation 902). The information may correspond to a transfer profile or a delete profile, and a profile ID or an ICCID may be transferred together with the information. If the transfer profile or the delete profile is received, in a case where a profile corresponding to the profile ID, the ICCID, or a mobile station international subscriber directory number (MSISDN) is installed in the first peripheral device, the first peripheral device 920 may remove the profile and generate information demonstrating that the profile is removed (operation 903). The information demonstrating that the profile is removed may be delete notification information. After the generation, the first peripheral device 920 may transfer the delete notification information or activation code information to the primary device 900 (operation 904). A corresponding activation code may correspond to information including a delete notification. The delete notification information may include at least one of a server address, an eUICC signature, a profile ID or an ICCID, eUICC certificate information, or sequence information preventing repetitive use of a notification message, so as to include information demonstrating that a corresponding profile is removed from a corresponding eUICC. The primary device 900 may store the delete notification or the activation code in a storage device of the primary device 900 (operation 905). A method of storage may be temporary storage for transfer to the second peripheral device 940 immediately after the storage, and may be continuous storage which is performed if there is no separate action taken in the primary device 900 for a case where the second peripheral device 940 is not specified.

The connection or the information transfer may be performed after a user inputs a profile transfer through the primary device 900. A method for inputting the profile transfer may be a method for specifying the first peripheral device 920 and the second peripheral device 940. An example for the specifying is illustrated in FIGS. 9B and 9C.

The primary device may be connected to the other one (the second peripheral device or a new peripheral device 940 (e.g., the second peripheral device)) of the peripheral devices (operation 906). The connection may be various connections of the above methods. The primary device 900 may transfer the stored activation code or delete notification information to the second peripheral device 940 (operation 907). The primary device 900 may transfer the activation code or delete notification information to the second peripheral device 940. The transfer may be performed through connections of various methods as described above, or may be performed through QR code scanning.

The second peripheral device 940 may download a profile from the SM-DP+ 980 by using at least one of the activation code information or the delete notification information. The second peripheral device 940 may directly communicate with the SM-DP+ 980, or may be connected thereto through the primary device 900. A profile downloading method performed by the second peripheral device 940 and the SM-DP+ 980 is as follows.

The second peripheral device 940 may transfer a first authentication request message (e.g., an ES9.InitiateAuthenticate Request) to the SM-DP+ 980 through the primary device 900, so as to start a mutual authentication process between the second peripheral device 940 and the SM-DP+ 980 (operation 908). The second peripheral device 940 may generate a random value to authenticate the SM-DP+ 980 before transferring, to the SM-DP+ 980, at least one of the activation code or the delete notification information received through the primary device 900. The second peripheral device 940 may transfer the random value to the SM-DP+ 980 through the primary device 900, and the SM-DP+ 980 may generate a server signature value with respect to information including the random value, and transfer the server signature value together with a server certificate through the primary device 900 to the second peripheral device 940. The second peripheral device 940 may verify the server signature value and the server certificate, may include a part or the entirety of the received activation code information or delete notification information in a second authentication request message (e.g., an ES9.AuthenticateClientRequest message), and may transfer the message to the SM-DP+ 980 through the primary device 900 (operation 909). The activation code information may include an entirety or a part of removal identification information. The removal identification information may correspond to a delete notification. If the corresponding information is received, the SM-DP+ 980 may perform one or more operations among an operation of verifying that a profile corresponding to the delete notification information is removed from an eUICC of the first peripheral device 920, and an operation of determining whether the profile can be transferred, so as to determine whether to download a profile corresponding to the removed profile in the second peripheral device 940 (operation 910). The SM-DP+ 980 may transfer a result of the determination as a mutual authentication response message through the primary device 900 to the second peripheral device 940. The mutual authentication response message may be an AuthenticateClient Response message.

The second peripheral device 940 receives a response for accepting profile downloading (operation 911). After the reception, the second peripheral device may request the SM-DP+ 980 for profile downloading through the primary device 900 by using a profile downloading request message (e.g., ES9.GetBoundProfilePackag) (operation 912). If the message is received, the SM-DP+ 980 may transfer an encrypted profile package corresponding to the message (operation 913). Thereafter, the second peripheral device 940 may install the corresponding profile in an eUICC of the second peripheral device 940.

In the embodiment, the connection between the primary device 900 and the first peripheral device 920 (operation 901), or the connection between the primary device 900 and the second peripheral device 940 (operation 906), which are established for the eUICC installation, may follow the methods illustrated in FIGS. 5A to 5C and FIGS. 8A to 8C. Specifically, the primary device 900 in an after-sales service mode may be connected to the first peripheral device 920 or the second peripheral device 940 through an HW device for after-sales service and a cable. One side or both sides of the cable may have a shape allowing the cable to be inserted in a SIM card slot. If each of both ends has a shape allowing the cable to be inserted in a SIM card slot, both ends of the cable may be inserted in and connected to the SIM card slots of the primary device 900 and the HW device for after-sales service, respectively. If the connection is established, an LPA of the HW device for after-sales service may be connected to the eUICC of the primary device 900. After the connection, the HW device for after-sales service may retrieve profile information from the eUICC of the primary device 900. For example, the LPA of the HW device for after-sales service may transfer a profile information request message (e.g., GetProfileInfo) to the eUICC of the primary device 900. After the transfer, the LPA of the HW device for after-sales service may receive information (e.g., a list of operational profiles) of profiles installed in the eUICC of the primary device 900.

The HW device for after-sales service may remove profiles to be moved from the eUICC of the primary device 900, and receive a removal identification message. The removal identification message may correspond to a delete notification. The HW device may create activation codes relating to the profiles. Profile removal and information of the delete notification may refer to the description illustrated in FIG. 2.

The HW device for after-sales service may print the created activation codes in a QR code type, may display the activation codes on a screen of the HW device for after-sales service, or may connect to the first peripheral device 920 or the second peripheral device 940, and transfer the activation codes to the first peripheral device or the second peripheral device. A method of connecting and transferring to the first peripheral device 920 or the second peripheral device 940 is described in detail with reference to FIG. 6.

In the following description, it is assumed that a printed or displayed QR code is scanned through the LPA of the first peripheral device 920 or the second peripheral device 940.

After the activation codes are scanned through QR code scanning, the first peripheral device 920 or the second peripheral device 940 receives profiles from the SM-DP+ 980 and installs the profiles through the procedure of operation 210 in FIG. 2.

Through the method described above, even if there is a problem in a main element, such as an application processor, a communication processor, or a communication function for operating the LPA of the primary device 900, a profile installed in the eUICC of the primary device 900 may be moved to another device by using the LPA of the HW device for after-sales service. For example, an after-sales service center of a terminal manufacturer may connect a cable to the primary device 900 that does not turn on, so as to move a profile installed in the primary device 900 to the first peripheral device 920 or the second peripheral device 940.

FIG. 9B illustrates an example of a user UX of a device during the operation illustrated in FIG. 9A.

Referring to FIG. 9B, one or more eSIM peripheral devices registered in a primary device may be displayed on a screen of the primary device (e.g., a smartphone). In addition, a peripheral device in which a profile is installed among the eSIM peripheral devices may be displayed distinguishably. For example, a SIM card icon may be displayed on the corresponding device. Moreover, if the eSIM peripheral device in which the profile is installed has been registered through the profile, the eSIM peripheral device may be displayed distinguishably. For example, the wording "connected" may be displayed around the peripheral device, or other icons may be additionally displayed.

Referring to FIG. 9B, it can be noted that an eSIM profile is installed in the left-side peripheral device, a service has been opened by using the profile, and the other two peripheral devices have no profiles. Hereinafter, for convenience, the left-side peripheral device is called a first peripheral device, and the middle peripheral device is called a second peripheral device. The primary device or the peripheral devices detect a user input indicating transfer of a profile from the first peripheral device to the second peripheral device. For example, if the second peripheral device is worn, and the second peripheral device obtains user consent for profile transfer, or obtains a pin number input made by the user, it may be assumed that a user input indicating transfer of a profile from the first peripheral device to the second peripheral device is detected.

In addition, for example, the second peripheral device is paired with the primary device, and the second peripheral device obtains user consent for profile transfer, or obtains a pin number input made by the user, so that it may be assumed that a user input indicating transfer of a profile from the first peripheral device to the second peripheral device is detected.

Alternatively, a user may drag and drop a SIM icon of the first peripheral device to the second peripheral device through the primary device, and may input consent for profile transfer. The corresponding operation is also illustrated in FIG. 9c.

Referring to FIG. 9B again, if a user intent for profile transfer as described above is transferred to the primary device and the peripheral devices, the primary device, the first peripheral device, and the second peripheral device are operated according to the procedure illustrated in FIG. 9A to perform profile transfer. If the procedure is complete, it may be noted from the right screen in the FIG. 9B that a profile is installed in the second peripheral device, and a communication state is identified.

FIG. 9C illustrates another example of a user UX of a device during the operation illustrated in FIG. 9A.

Referring to FIG. 9C, a primary device may add an eSIM profile to a particular device with respect to multiple peripheral devices, or may transfer a profile in one peripheral device to another peripheral device.

As shown on the screen of the primary device in FIG. 9C, a screen, such as "My eSIM Devices," for controlling an eSIM terminal may be displayed. Also, the screen of the primary device may provide a user with a method for transferring an eSIM profile of one peripheral device to another peripheral device. For example, as shown in FIG. 9C, a profile transfer method for dragging and moving a SIM card icon of a device and dropping the icon onto another terminal may be provided. Also, the screen of the primary device may provide a user with a method for temporarily transferring an eSIM profile of a peripheral device to the primary device, and transferring the profile to another peripheral device later. The temporary transferring of the profile to the primary device may be installing the profile in the primary device, or storing only an activation code or delete notification information for installing the profile, in a storage of the primary device.

In addition, the screen of the primary device may show multiple eSIM peripheral devices. The screen of the primary device may display a device in which a profile is installed, among the eSIM peripheral devices through a separate display method. For example, if there is a profile installed in a peripheral device, the screen of the primary device may show the peripheral device together with a SIM card icon. Similarly, if there is no profile installed in a peripheral device, the screen of the primary device may not display a SIM card icon to indicate that there is no SIM card installed in the peripheral device. Alternatively, if connection of a peripheral device in which a profile is installed is active, the screen of the primary device may display the active connection on the peripheral device. As shown in the screen of the primary device in FIG. 9C, a first peripheral device (a tablet PC) has an eSIM profile installed therein, and the connection is active. Meanwhile, a connected car, as an example of other devices displayed together with the first peripheral device, has no profile installed therein, and the connection is also inactive. Having no profile installed implies that there is no profile directly managed by a user, and it should be noted that a separate communication profile for managing a device may be installed in the device separately from the directly managed profile. For example, a second peripheral device, that is, the connected car does not have an eSIM profile directly managed and used by a user. However, it should be noted that the connected car may have a separate communication profile installed therein so that an automobile company, a communication company, or an IoT service company provides communication used for managing or maintaining the state of the car.

Subsequently, as shown in the screen of the primary device in FIG. 9C, the screen of the primary device may provide a method for newly installing a profile in a peripheral device.

In relation to the screen of the primary device as described above, the screens of the primary device illustrated in FIG. 9C show a procedure of transferring a profile from the first peripheral device to the second peripheral device. First, a user touches a SIM card icon with his/her hand and maintains the contact. In this state, if the user moves the hand onto the second peripheral device without releasing the hand from the screen, the SIM card icon moving according to the hand is displayed. The user releases the hand from the screen on the second peripheral device. Then, the primary device may receive an opinion of consent or confirmation for transfer of the profile, which is input by the user, and may proceed with the profile transfer procedure illustrated in FIG. 9A.

If installation of the profile is complete, the screen of the primary device may place the SIM icon to be fixed on the second peripheral device, to indicate that the installation of the profile is complete. In addition, if it is identified that the connection of the second peripheral device is activated by using the installed profile, the screen of the primary device may display that the corresponding peripheral device has been connected.

In addition, although not illustrated in FIG. 9C, the screen of the primary device may display the primary device together with the peripheral devices, so that a profile transfer between the primary device and the peripheral devices can be processed in the same way. Additionally, another primary device may be additionally displayed, so that a profile transfer between the first primary device and the second primary device can be processed in the same way. Additionally, the screen of the primary device may display one or more of peripheral devices, the primary device, another primary device, and cloud servers (FIGS. 10B and 11B), and may provide various profile transfers as below:

Profile transfer between a peripheral device and a peripheral device;

Profile transfer between a primary device and a peripheral device;

Profile transfer between a primary device and another primary device;

Profile transfer between another primary device and yet other peripheral device;

Profile transfer between another primary device and a peripheral device;

Profile transfer between a primary device and a cloud server;

Profile transfer between a peripheral device and a cloud server;

Profile transfer between another primary device and a cloud server; and/or

Profile transfer between a cloud server and a cloud server.

In the examples, the transfer of a profile may imply that transferring and installing of the profile in a corresponding device is complete, may imply that only an activation code is transferred so that the profile is ready to install anytime, or may imply that the activation code is stored to be transferred to another device later. For example, a profile transfer from a peripheral device or a primary device to a cloud server may imply that an activation code is transferred to the cloud server, and the cloud server stores the activation code.

Figure 10A:
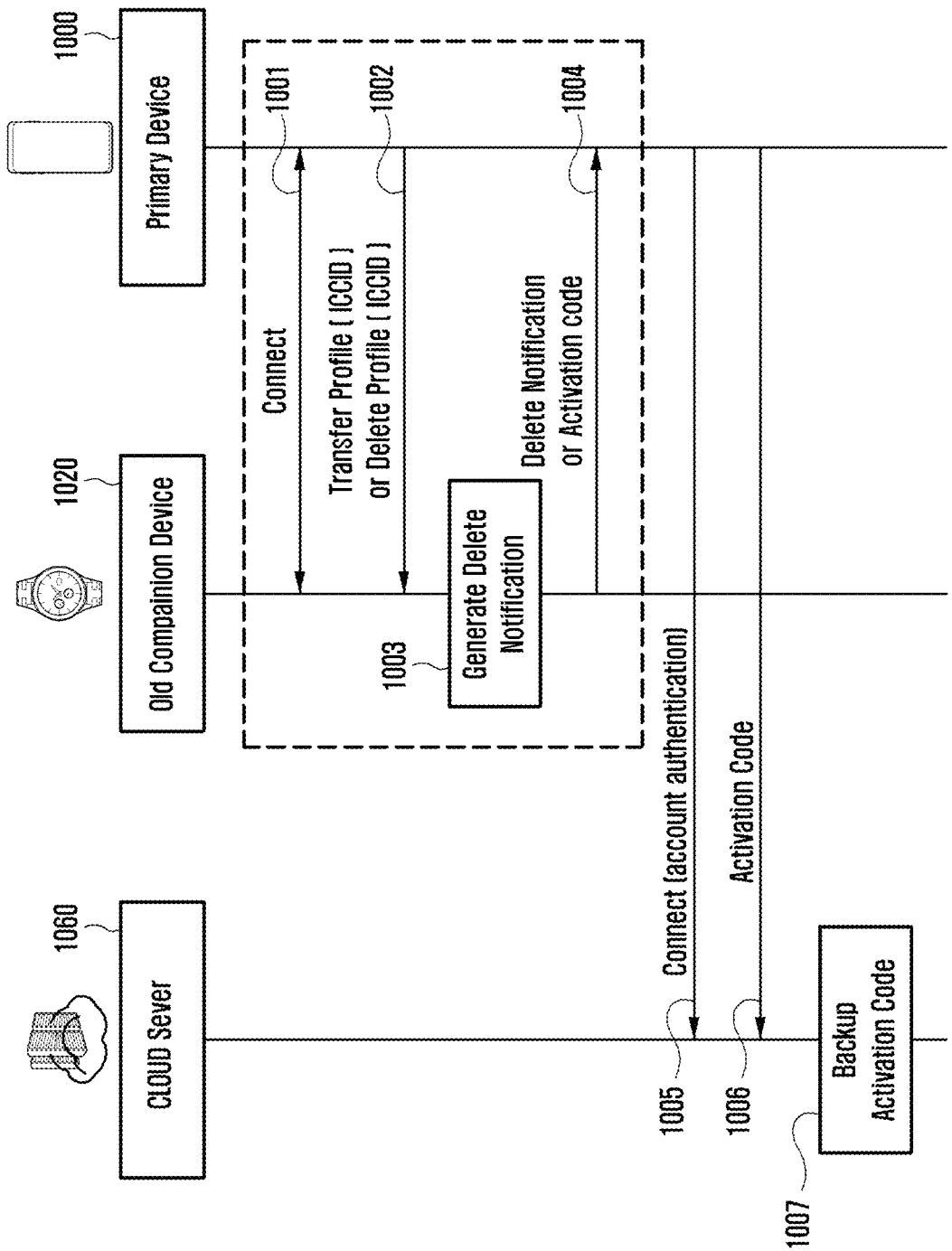
FIG. 10A illustrates a procedure of backing up an activation code or a profile of a peripheral device in a cloud by using a primary device according to an embodiment.
Figure 10B:
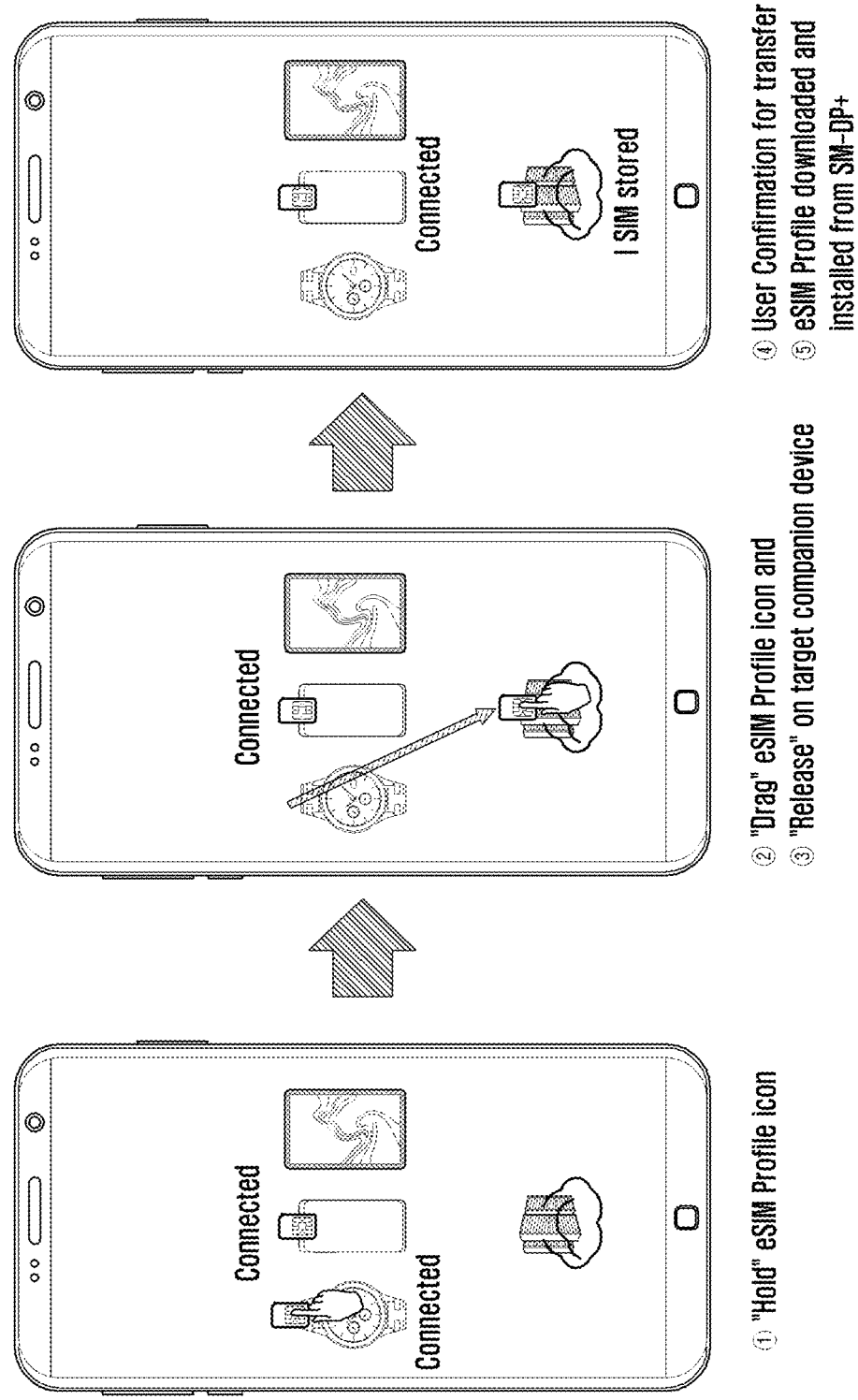
FIG. 10B illustrates an example of a user UX of a device during the operation illustrated in FIG. 10A.

Sixth Embodiment-Back Up Activation Code Corresponding to Profile from First Peripheral Device to Cloud Server Through Primary Device, and Restore Profile from Cloud Server to Second Peripheral Device FIG. 10A illustrates a procedure of, when a primary device backs up an activation code corresponding to a profile from a first peripheral device to a cloud server, and restores the profile from the cloud server to a second peripheral device, backing up the activation code from the primary device to the cloud server according to an embodiment, and FIG. 10B illustrates an example of a user UX of a device according to an embodiment.

FIG. 10A illustrates a procedure of backing up an activation code or a profile of a peripheral device 1020 (e.g., the first peripheral device) in a cloud server 1060 by using a primary device 1000 according to an embodiment.

A system illustrated in FIG. 10A may include a primary device 1000, a first peripheral device 1020, and a cloud server 1060. The primary device 900, the first peripheral device 920, and the second peripheral device 940 may be called a first device, a second device, and a third device, respectively.

Referring to FIG. 10A, the primary device 1000 may be connected to the first peripheral device 1020 (operation 1001). The connection may be various connections of the above methods. First, the primary device 1000 may transfer information for profile transfer to the first peripheral device 1020 (operation 1002). The information may correspond to a transfer profile or a delete profile, and a profile ID or an ICCID may be transferred together with the information. If the transfer profile or the delete profile is received, in a case where a profile corresponding to the profile ID, the ICCID, or an MSISDN is installed in the first peripheral device, the first peripheral device 1020 may remove the profile and generate delete notification information demonstrating that the profile is removed (operation 1003). The primary device 1000 may receive a delete notification or an activation code required for profile transfer from the first peripheral device 1020 (operation 1004). The primary device 1000 may be connected to the cloud server 1060 (operation 1005). The connection may be various connections of the above methods. The primary device 1000 may transfer the corresponding information to the cloud server 1060 (operation 1006), and the cloud server 1060 may store the information (operation 1007).

The cloud server 1060 may store the activation code in association with user account information, and thus if the same user or the same device requests an activation code in the future, the cloud server can provide the activation code.

In the embodiment, the connection between the primary device 1000 and the first peripheral device 1020 for the eUICC installation may follow the methods illustrated in FIGS. 5A to 5C and FIGS. 8A to 8C. Specifically, the primary device 1000 in an after-sales service mode may be connected to the first peripheral device 1020 through an HW device for after-sales service and a cable. One side or both sides of the cable may have a shape allowing the cable to be inserted in a SIM card slot. If each of both ends has a shape allowing the cable to be inserted in a SIM card slot, both ends of the cable may be inserted in and connected to the SIM card slots of the primary device 1000 and the HW device for after-sales service, respectively. If the connection is established, an LPA of the HW device for after-sales service may be connected to the eUICC of the primary device 1000. After the connection, the HW device for after-sales service may retrieve profile information from the eUICC of the primary device 1000. For example, the LPA of the HW device for after-sales service may transfer a profile information request message (e.g., GetProfileInfo) to the eUICC of the primary device 1000. After the transfer, the LPA of the HW device for after-sales service may receive information (e.g., a list of operational profiles) of profiles installed in the eUICC of the primary device 1000.

The HW device for after-sales service may remove profiles to be moved from the eUICC of the primary device 1000, and receive a removal identification message. The removal identification message may correspond to a delete notification. The HW device may create activation codes relating to the profiles. Profile removal and information of the delete notification may refer to the description illustrated in FIG. 2.

The HW device for after-sales service may print the created activation codes in a QR code type, may display the activation codes on a screen of the HW device for after-sales service, or may connect to the first peripheral device 1020, and transfer the activation codes to the first peripheral device or the second peripheral device. A method of connecting and transferring to the first peripheral device 1020 is described in detail with reference to FIG. 6.

In the description of the embodiment, it is assumed that a printed or displayed QR code is scanned through the LPA of the first peripheral device 1020.

After the activation codes are scanned through QR code scanning, the first peripheral device 1020 receives profiles from SM-DP+ and installs the profiles through the procedure of operation 210 in FIG. 2.

Through the method described above, even if there is a problem in a main element, such as an application processor, a communication processor, or a communication function for operating the LPA of the primary device 1000, a profile installed in the eUICC of the primary device 1000 may be moved to another device by using the LPA of the HW device for after-sales service. For example, an after-sales service center of a terminal manufacturer may connect a cable to the primary device 1000 that does not turn on, so as to move a profile installed in the primary device 1000 to the first peripheral device 1020.

FIG. 10B illustrates an example of a user UX of a device during the operation illustrated in FIG. 10A.

FIG. 10B shows an example of a screen of a primary device during a process of transferring a profile to a cloud server and storing the profile therein.

Referring to FIG. 10B, on the screen of the primary device, an eSIM profile may be transferred between the primary device, a peripheral device, and a cloud server.

As shown on the screen of the primary device in FIG. 10B, the screen of the primary device may provide a user with a method for transferring an eSIM profile between devices, and the cloud server. For example, as shown in FIG. 10B, a profile transfer method for dragging and moving a SIM card icon of a device and dropping the icon onto another device or the cloud server may be provided. Also, the screen of the primary device may provide a user with a method for temporarily transferring an eSIM profile of a peripheral device to the primary device, and transferring the profile to another peripheral device later.

The screen of the primary device may show a plurality of eSIM peripheral devices, the primary device, another primary device, or a cloud server. The screen of the primary device may display a device in which a profile is installed, among the eSIM peripheral devices or the primary devices through a separate display method. For example, if there is a profile installed in a peripheral device, the screen of the primary device may show the peripheral device together with a SIM card icon. Similarly, if there is a profile installed in a primary device, the screen of the primary device may show the primary device together with a SIM card icon. Similarly, if there is no profile installed in a peripheral device or a primary device, the screen of the primary device may not display a SIM card icon to indicate that there is no profile installed in the peripheral device or primary device. Similarly, if a cloud server does not store an eSIM profile of a corresponding user or device, the screen of the primary device does not display a SIM card icon, thereby indicating that there is no SIM card stored in the cloud server. In addition, if connection of a peripheral device or a primary device in which a profile is installed is active, the screen of the primary device may display the active connection on the peripheral device. As shown in the left screen illustrated in FIG. 10B, the left-side wearable device and the primary device have an eSIM profile installed therein, and the connections are active. Meanwhile, another tablet PC displayed together has no profile installed therein, and the connection is also inactive.

In the screens of the primary device as described above, the screens (left-side, middle, right-side) of the primary device illustrated in FIG. 10B show a procedure of transferring or backing up a profile from a peripheral device to a cloud server. The transferring procedure may imply transferring an activation code to the cloud server, or actually installing a profile in an eUICC installed in the cloud server. First, a user touches a SIM card icon with his/her hand and maintains the contact. In this state, if the user moves the hand onto the cloud server without releasing the hand from the screen, the SIM card icon moving according to the hand is displayed. The user releases the hand from the screen on the cloud server. Then, the primary device may receive an opinion of consent or confirmation for transfer of the profile, which is input by the user, and may proceed with the profile transfer procedure illustrated in FIG. 9A. If a profile is stored in the cloud server rather than being installed in an eUICC of the cloud server, an activation code may be received from a peripheral device to the primary device, and then the activation code may be transferred to the cloud server, and stored in the storage of the cloud server, thereby finishing the profile transfer procedure. The cloud server may store the activation code to match the primary device, a subscriber account, a device account, or a device ID.

Subsequently, as shown in FIG. 10B, if the transfer of the profile is complete, the screen of the primary device may place a SIM icon to be fixed on the cloud server, to indicate that the transfer of the profile is complete. In addition, the screen of the primary device may display how many profiles are included in the cloud server including the transferred profile. In addition, although not illustrated in FIG. 10B, the cloud server may receive, from the primary device, plan information, a phone number, a nickname, communication company information, and a profile ID corresponding to the activation code stored in the cloud server, and store them in association with the activation code.

In addition, although not illustrated in FIG. 10B, a profile of the primary device may be transferred to the cloud server by using the same process described above. Another device may connect to the cloud server and perform an authentication and registration process. The user may drag and drop a SIM icon of the cloud server onto the corresponding device to move the profile, so as to support convenient device-to-device transfer. The cloud server may retrieve various pieces of information such as user information, app installation information, contact information, or schedule information, in addition to the profile. The method described above can be operated in various schemes by which a corresponding device can be specified, and not necessarily the method of dragging and dropping the SIM card icon. For example, a device accesses the cloud server, logs in using a user account, and runs a backup operation. Then, the device backs up configuration information, such as the contact information, app installation information, or schedule information, together with profile information. Therefore, in the future, if another device accesses the cloud server, logs in using the user account, and executes a restoring operation, it may be possible to retrieve backup information including the profile to another device.

Figure 11A:
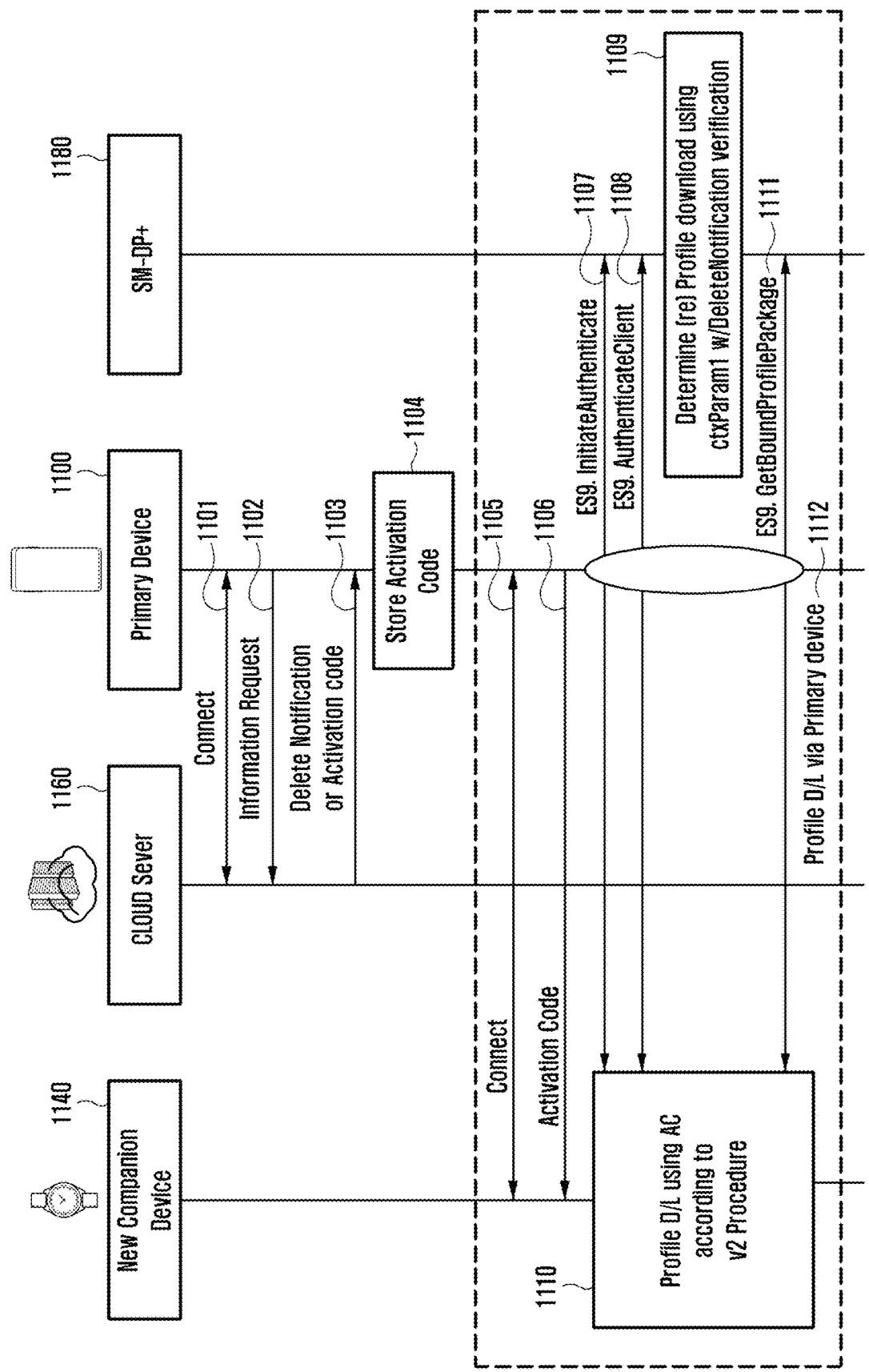
FIG. 11A illustrates a procedure of, by using a primary device, receiving an activation code or a profile from a cloud, transferring the profile to a peripheral device, and installing the profile in the peripheral device according to an embodiment.

Seventh Embodiment-Primary Device Obtains Activation Code Backed Up in Cloud Server and Transfers Activation Code to Second Peripheral Device, to Transfer Profile to Second Peripheral Device and Install Same Therein FIG. 11A illustrates a procedure in which, when a primary device backs up an activation code corresponding to a profile from a first peripheral device to a cloud server and restores the profile from the cloud server to a second peripheral device, the primary device obtains the activation code backed up/stored in the cloud server and installs the profile in the second peripheral device according to an embodiment, and FIG. 11B illustrates an example of a user UX of a device according to an embodiment.

A system illustrated in FIG. 11A may include a primary device 1100, a peripheral device 1140, a cloud server 1160, and a profile providing server 1180. The profile providing server 1180 may be SM-DP+. The primary device 1100, the peripheral device 1140, Cloud server 1160, and the profile providing server 1180 may be called a first device, a second device, a third device, and a fourth device, respectively.

FIG. 11A illustrates a procedure of receiving a profile or an activation code from the cloud server 1160 by using the primary device 1100, transferring the profile to the peripheral device 1140, and installing the profile therein according to an embodiment.

Referring to FIG. 11A, the primary device 1100 may be connected to the cloud server 1160 (operation 1101). When the connection is established, user account information or device information, and information such as a device ID may be transferred to the cloud server 1160 so that the cloud server can identify the account. As illustrated in FIG. 10B, the primary device 1100 may request the cloud server 1160 for various information in addition to an activation code stored together with the account information (operation 1102). The cloud server 1160 may transfer the activation code and various additional information to the primary device 1100 (operation 1103). The primary device 1100 may store the information including the activation code in a storage device of the primary device 1100 (operation 1104).

By using the activation code, the primary device 1100 may transfer the activation code to the peripheral device 1140 like the procedure illustrated in FIG. 9A, may download and install a profile in the peripheral device, and may display a corresponding result on a user UX illustrated in FIG. 11B.

The primary device 1100 may be connected to the peripheral device 1140 (operation 1105). The connection may be various connections of the above methods. The primary device 1100 may transfer the information including the stored activation code to the peripheral device 1140 (operation 1106). The primary device 1100 may transfer the information including the activation code to the peripheral device 1140. The transfer may be performed through connections of various methods as described above, or may be performed through QR code scanning.

The peripheral device 1140 may download a profile from the SM-DP+ 1180 by using the information including the activation code. The peripheral device 1140 may directly communicate with the SM-DP+ 1180, or may be connected thereto through the primary device 1100. A profile downloading method performed by the peripheral device 1140 and the SM-DP+ 1180 is as follows.

The peripheral device 1140 may transfer a first authentication request message (e.g., an ES9.InitiateAuthenticate Request) to the SM-DP+ 1180 through the primary device 1100 (operation 1107). Then, a mutual authentication process between the peripheral device 1140 and the SM-DP+ 1180 may start. The peripheral device 1140 may generate a random value to authenticate the SM-DP+ 1180 before transferring, to the SM-DP+ 1180, the information including the activation code received through the primary device 1100. The peripheral device 1140 may transfer the random value to the SM-DP+ 1180 through the primary device 1100, and the SM-DP+ 1180 may generate a server signature value with respect to information including the random value, and transfer the server signature value together with a server certificate through the primary device 1100 to the peripheral device 1140. The peripheral device 1140 may verify the server signature value and the server certificate, may include a part or the entirety of the received activation code information in a second authentication request message (e.g., an ES9.AuthenticateClientRequest message), and may transfer the message to the SM-DP+ 1180 through the primary device 1100 (operation 1108). The activation code information may include an entirety or a part of removal identification information. The removal identification information may correspond to a delete notification. If the corresponding information is received, the SM-DP+ 1180 may perform one or more operations among an operation of verifying that a profile corresponding to the delete notification information is removed from an eUICC of the cloud server 1160, and an operation of determining whether the profile can be transferred, so as to determine whether to download a profile corresponding to the removed profile in the peripheral device 1140 (operation 1109). The SM-DP+ may transfer a result of the determination as a mutual authentication response message through the primary device 1100 to the peripheral device 1140. The mutual authentication response message may be an AuthenticateClient Response message.

The peripheral device 1140 receives a response accepting profile downloading (operation 1110). After the reception, the peripheral device may request the SM-DP+ 1180 for profile downloading through the primary device 1100 by using a profile downloading request message (e.g., ES9.GetBoundProfilePackag) (operation 1111). If the message is received, the SM-DP+ 1180 may transfer an encrypted profile package corresponding to the message (operation 1112). Thereafter, the peripheral device 1140 may install the corresponding profile in an eUICC of the peripheral device 1140.

In the embodiment, the connection between the primary device 1100 and the peripheral device 1140 for the eUICC installation may follow the methods illustrated in FIGS. 5A to 5C and FIGS. 8A to 8C. Specifically, the primary device 1100 in an after-sales service mode may be connected to the peripheral device 1140 through an HW device for after-sales service and a cable. One side or both sides of the cable may have a shape allowing the cable to be inserted in a SIM card slot. If each of both ends has a shape allowing the cable to be inserted in a SIM card slot, both ends of the cable may be inserted in and connected to the SIM card slots of the primary device 1100 and the HW device for after-sales service, respectively. If the connection is established, an LPA of the HW device for after-sales service may be connected to the eUICC of the primary device 1100. After the connection, the HW device for after-sales service may retrieve profile information from the eUICC of the primary device 1100. For example, the LPA of the HW device for after-sales service may transfer a profile information request message (e.g., GetProfileInfo) to the eUICC of the primary device 1100. After the transfer, the LPA of the HW device for after-sales service may receive information (e.g., a list of operational profiles) of profiles installed in the eUICC of the primary device 1100.

The HW device for after-sales service may remove profiles to be moved from the eUICC of the primary device 1100, and receive a removal identification message. The removal identification message may correspond to a delete notification. The HW device may create activation codes relating to the profiles. Profile removal and information of the delete notification may refer to the description illustrated in FIG. 2.

The HW device for after-sales service may print the created activation codes in a QR code type, may display the activation codes on a screen of the HW device for after-sales service, or may connect to the peripheral device 1140, and transfer the activation codes to the peripheral device. A method of connecting and transferring to the peripheral device 1140 is described in detail with reference to FIG. 6.

In the description of the embodiment, it is assumed that a printed or displayed QR code is scanned through the LPA of the peripheral device 1140.

After the activation codes are scanned through QR code scanning, the peripheral device 1140 receives profiles from the SM-DP+ 1180 and installs the profiles through the procedure of operation 210 in FIG. 2.

Through the method described above, even if there is a problem in a main element, such as an application processor, a communication processor, or a communication function for operating the LPA of the primary device 1100, a profile installed in the eUICC of the primary device 1100 may be moved to another device by using the LPA of the HW device for after-sales service. For example, an after-sales service center of a terminal manufacturer may connect a cable to the primary device 1100 that does not turn on, so as to move a profile installed in the primary device 1100 to the peripheral device 1140.

FIG. 11B illustrates an example of a user UX of a device during the operation illustrated in FIG. 11A according to the disclosure.

Referring to FIG. 11B, the screen of the primary device may place a SIM icon to be fixed onto the cloud server, so as to indicate that a profile or an activation code is stored therein. In addition, the screen of the primary device may display how many profiles are included in the cloud server. In addition, although not illustrated in FIG. 11B, the cloud server stores plan information, a phone number, a nickname, communication company information, and a profile ID corresponding to an activation code stored in the cloud server in association with the activation code. Therefore, the cloud server provides the above information to the primary device, and the primary device may display the information for a purpose of allowing a user to separate a profile or plan.

On the contrary to the process illustrated in FIG. 10B, if a user intent to retrieve an activation code stored in the cloud to a peripheral device or the primary device is input on the screen of the primary device, the primary device may transfer the activation code obtained from the cloud server to the peripheral device or the primary device, to reinstall a profile.

In addition, although not illustrated in FIG. 10B, a profile of the primary device may be transferred to the cloud server by using the same process described above. Another device may connect to the cloud server and perform an authentication and registration process. The user may drag and drop a SIM icon of the cloud server onto the corresponding device to move the profile, so as to support convenient device-to-device transfer. The cloud server may retrieve various pieces of information such as user information, app installation information, contact information, or schedule information, in addition to the profile. The method described above can be operated in various schemes by which a corresponding device can be specified, and not necessarily the method of dragging and dropping the SIM card icon. For example, a device accesses the cloud server, logs in using a user account, and runs a backup operation. Then, the device backs up configuration information, such as the contact information, app installation information, or schedule information, together with profile information. Therefore, in the future, if another device accesses the cloud server, logs in using the user account, and executes a restoring operation, it may be possible to retrieve backup information including the profile to another device.

Figure 12:
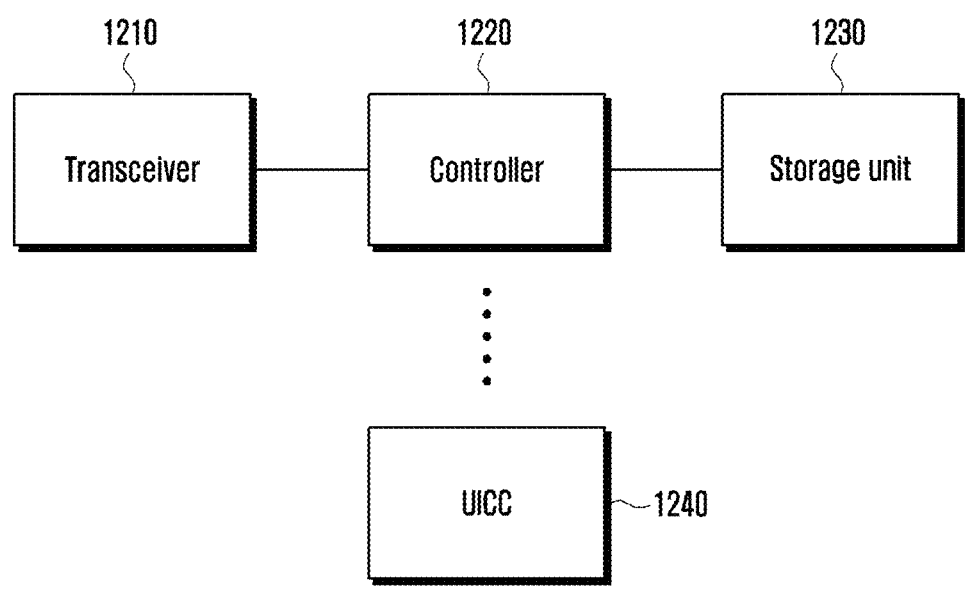
FIG. 12 illustrates a structure of a terminal according to an embodiment.

FIG. 12 illustrates a structure of a terminal according to an embodiment.

Referring to FIG. 12, a terminal may include a transceiver 1210, a controller 1220, and a storage unit 1230. In the disclosure, the controller may be defined as a circuit, an application-specific integrated circuit, or at least one processor. The terminal may further include a UICC 1240. The UICC 1240 may be embedded in the terminal, or may be inserted in the terminal in an attachable/detachable scheme.

The transceiver 1210 may transmit or receive a signal to or from another network entity. The transceiver 1210 may, for example, receive system information from a base station, or may receive a synchronization signal or a reference signal.

The controller 1220 may control the overall operations of the terminal according to the embodiments provided in the disclosure. For example, the controller 1220 may control a signal flow between blocks to perform operations according to the flowcharts illustrated above.

The storage unit 1230 may store at least one of information transmitted or received through the transceiver 1210 and information generated through the controller 1220.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a first terminal, the method comprising:
transmitting, to a second terminal, a first message indicating removal of a first profile stored in the second terminal;
receiving, from the second terminal, a second message including activation code information, wherein the activation code information includes delete notification information relating to the removal of the first profile; and
transmitting, to a third terminal, a third message including the activation code information,
wherein the activation code information is used to install, to the third terminal, a second profile corresponding to the first profile stored in the second terminal.

2. The method of claim 1, wherein the second profile comprises an integrated circuit card identifier (ICCID) corresponding to that of the first profile stored in the second terminal,
wherein the second profile comprises a profile corresponding to a mobile station international subscriber directory number (MSISDN) corresponding to that of the first profile stored in the second terminal, and
wherein the delete notification information comprises at least one of an address of a profile server, an embedded universal integrated circuit card (eUICC) signature of the second terminal, an ID of the first profile, an ICCID, eUICC certificate information of the second terminal, or information preventing repetitive use of the second message.

3. The method of claim 1, further comprising:
selecting the first profile stored in the second terminal and displaying the first profile on a display of the first terminal;
selecting the third terminal to which the selected first profile is transferred; and
transmitting the first message based on the selection of the third terminal.

4. The method of claim 1, wherein the first terminal comprises a switch structure configured to connect between a local profile assistant (LPA) of the first terminal and an eUICC of the second terminal, and
wherein, when at least one of the first terminal or the second terminal is in an after-sales service (AS) mode, the first terminal, based on the switch structure, transmits the first message and receives the second message through a connection between the LPA of the first terminal and the eUICC of the second terminal.

5. A method of a second terminal, the method comprising:
receiving, from a first terminal, a first message indicating removal of a first profile stored in the second terminal;
removing the first profile in response to receiving the first message;
generating delete notification information relating to the removal of the first profile; and transmitting, to the first terminal, a second message including activation code information, wherein the activation code information includes the delete notification information,
wherein the activation code information is used to install, to a third terminal, a second profile corresponding to the first profile stored in the second terminal.

6. The method of claim 5, wherein the second profile comprises an integrated circuit card identifier (ICCID) corresponding to that of the first profile stored in the second terminal,
wherein the second profile comprises a profile corresponding to a mobile station international subscriber directory number (MSISDN) corresponding to that of the first profile stored in the second terminal, and
wherein the delete notification information comprises at least one of an address of a profile server, an embedded universal integrated circuit card (eUICC) signature of the second terminal, an ID of the first profile, an ICCID, eUICC certificate information of the second terminal, or information preventing repetitive use of the second message.

7. The method of claim 5, wherein the second terminal comprises a switch structure configured to connect between a local profile assistant (LPA) of the first terminal and an eUICC of the second terminal, and
wherein, when at least one of the first terminal or the second terminal is in an after-sales service (AS) mode, the second terminal, based on the switch structure, receives the first message and transmits the second message through a connection between the LPA of the first terminal and the eUICC of the second terminal.

8. A method of a third terminal, the method comprising:
receiving, from a first terminal, a third message including activation code information, wherein the activation code information includes delete notification information relating to removal of a first profile stored in a second terminal; and
installing, to the third terminal, a second profile by using the activation code information,
wherein the second profile corresponds to the first profile stored in a second terminal.

9. The method of claim 8, wherein the second profile comprises an integrated circuit card identifier (ICCID) corresponding to that of the first profile stored in the second terminal,
wherein the second profile comprises a profile corresponding to a mobile station international subscriber directory number (MSISDN) corresponding to that of the first profile stored in the second terminal.

10. The method of claim 8, wherein installing the second profile comprises:
downloading the second profile from a profile server through the first terminal and installing the second profile to the third terminal; and
updating a profile nickname of the second profile to the profile nickname of the first profile after downloading and installing the second profile.

11. A first terminal comprising:
a transceiver; and
a controller coupled to the transceiver,
wherein the controller is configured to:
transmit, to a second terminal, a first message indicating removal of a first profile stored in the second terminal;
receive, from the second terminal, a second message including activation code information, wherein the activation code information includes delete notification information relating to the removal of the first profile; and
transmit, to a third terminal, a third message including the activation code information, and
wherein the activation code information is used to install, to the third terminal, a second profile corresponding to the first profile stored in the second terminal.

12. The first terminal of claim 11, wherein the second profile comprises an integrated circuit card identifier (ICCID) corresponding to that of the first profile stored in the second terminal,
wherein the second profile comprises a profile corresponding to a mobile station international subscriber directory number (MSISDN) corresponding to that of the first profile stored in the second terminal, and
wherein the delete notification information comprises at least one of an address of a profile server, an embedded universal integrated circuit card (eUICC) signature of the second terminal, an ID of the first profile, an ICCID, eUICC certificate information of the second terminal, or information preventing repetitive use of the second message.

13. The first terminal of claim 11, further comprising a display,
wherein the controller is configured to:
select the first profile stored in the second terminal and display the first profile on the display of the first terminal;
select the third terminal to which the selected first profile is transferred; and
transmit the first message based on the selection of the third terminal.

14. The first terminal of claim 11, further comprising a switch structure configured to connect between a local profile assistant (LPA) of the first terminal and an eUICC of the second terminal,
wherein, when at least one of the first terminal or the second terminal is in an after-sales service (AS) mode, the first terminal, based on the switch structure, transmits the first message and receives the second message through a connection between the LPA of the first terminal and the eUICC of the second terminal.

15. A second terminal comprising:
a transceiver; and
a controller coupled to the transceiver,
wherein the controller is configured to:
receive, from a first terminal, a first message indicating removal of a first profile stored in the second terminal;
remove the first profile in response to receiving the first message;
generate delete notification information relating to the removal of the first profile; and
transmit, to the first terminal, a second message including activation code information, wherein the activation code information includes the delete notification information,
wherein the activation code information is used to install, to a third terminal, a second profile corresponding to the first profile stored in the second terminal.

16. The second terminal of claim 15, wherein the second profile comprises an integrated circuit card identifier (ICCID) corresponding to that of the first profile stored in the second terminal,
wherein the second profile comprises a profile corresponding to a mobile station international subscriber directory number (MSISDN) corresponding to that of the first profile stored in the second terminal, and wherein the delete notification information comprises at least one of an address of a profile server, an embedded universal integrated circuit card (eUICC) signature of the second terminal, an ID of the first profile, an ICCID, eUICC certificate information of the second terminal, or information preventing repetitive use of the second message.

17. The second terminal of claim 15, further comprising a switch structure configured to connect between a local profile assistant (LPA) of the first terminal and an eUICC of the second terminal, wherein, when at least one of the first terminal or the second terminal is in an after-sales service (AS) mode, the second terminal, based on the switch structure, receives the first message and transmits the second message through a connection between the LPA of the first terminal and the eUICC of the second terminal.

18. A third terminal comprising:
a transceiver; and
a controller coupled to the transceiver,
wherein the controller is configured to:
receive, from a first terminal, a third message including activation code information, wherein the activation code information includes delete notification information relating to removal of a first profile stored in a second terminal; and
install, to the third terminal, a second profile by using the activation code information,
wherein the second profile corresponds to the first profile stored in a second terminal.

19. The third terminal of claim 18, wherein the second profile comprises an integrated circuit card identifier (IC-CID) corresponding to that of the first profile stored in the second terminal, and wherein the second profile comprises a profile corresponding to a mobile station international subscriber directory number (MSISDN) corresponding to that of the first profile stored in the second terminal.

20. The third terminal of claim 18, wherein the controller is further configured to:
download the second profile from a profile server through the first terminal and install the second profile to the third terminal; and
update a profile nickname of the second profile to the profile nickname of the first profile after downloading and installing the second profile.

* * * * *